(12) United States Patent
Carranza et al.

(10) Patent No.: US 12,493,137 B1
(45) Date of Patent: Dec. 9, 2025

(54) BUILDING NATURAL FRACTURES MODEL USING 3D STACKED GEOLOGICAL MODELS

(71) Applicant: Saudi Arabian Oil Company, Dhahran (SA)

(72) Inventors: Karla Olvera Carranza, Dhahran (SA); Otto Meza Camargo, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 42 days.

(21) Appl. No.: 18/739,747

(22) Filed: Jun. 11, 2024

(51) Int. Cl.
*G01V 20/00* (2024.01)
*E21B 44/00* (2006.01)
*E21B 49/00* (2006.01)

(52) U.S. Cl.
CPC .............. *G01V 20/00* (2024.01); *E21B 44/00* (2013.01); *E21B 49/00* (2013.01); *E21B 2200/20* (2020.05)

(58) Field of Classification Search
CPC ......... G01V 20/00; E21B 44/00; E21B 49/00; E21B 2200/20
See application file for complete search history.

(56) References Cited

U.S. PATENT DOCUMENTS

| | | |
|---|---|---|
| 6,502,037 B1 | 12/2002 | Jorgensen et al. |
| 6,705,398 B2 | 3/2004 | Weng |
| 6,904,365 B2 | 6/2005 | Bratton et al. |
| 7,025,138 B2 | 4/2006 | Kurkjian et al. |
| 7,042,802 B2 | 5/2006 | Sinha |
| 7,337,660 B2 | 3/2008 | Ibrahim et al. |
| 7,457,194 B2 | 11/2008 | Prioul et al. |
| 7,526,385 B2 | 4/2009 | Sayers |

(Continued)

FOREIGN PATENT DOCUMENTS

| | | |
|---|---|---|
| AU | 2013374225 B2 | 7/2014 |
| AU | 2018267575 B9 | 12/2018 |

(Continued)

OTHER PUBLICATIONS

Wehunt, D. et al.; "Stochastic 2D Well Path Assessments for Naturally Fractured Carbonate Reservoirs" SPE-180468-MS, SPE Western Regional Meeting, Anchorage, AK, May 23-26, 2016; pp. 1-36.

(Continued)

*Primary Examiner* — Yong-Suk (Philip) Ro
(74) *Attorney, Agent, or Firm* — Bracewell LLP; Constance G. Rhebergen; Brian H. Tompkins

(57) ABSTRACT

The constructing of a natural fracture model of a secondary reservoir in a field by using the information from a primary reservoir within a stacked 3D geological model. A fracture model may be constructed for a primary reservoir that incorporates a specific paleo-stress regime and information from a stacked 3D geological model, a deformation model, and a geomechanical model. Parameters such as a deformation model, brittleness index, and stress model may be extracted from the fracture model for a primary reservoir. A fracture model for the secondary reservoir is then constructed from the extracted parameters, and the fracture model is used to identify locations in the secondary reservoir for drilling and other operations.

24 Claims, 10 Drawing Sheets
(7 of 10 Drawing Sheet(s) Filed in Color)

(56) References Cited

U.S. PATENT DOCUMENTS

| | | | |
|---|---|---|---|
| 7,562,278 B2 | 7/2009 | Lyakh et al. |
| 7,565,278 B2 | 7/2009 | Li et al. |
| 7,679,993 B2 | 3/2010 | Sayers |
| 7,707,018 B2 | 4/2010 | Shaw |
| 7,941,307 B2 | 5/2011 | Symington et al. |
| 8,010,294 B2 | 8/2011 | Dorn et al. |
| 8,024,124 B2 | 9/2011 | Sayers |
| 8,041,510 B2 | 10/2011 | Dasgupta |
| 8,078,405 B2 | 12/2011 | Delorme |
| 8,121,792 B2 | 2/2012 | Hsu et al. |
| 8,204,727 B2 | 6/2012 | Dean et al. |
| 8,275,589 B2 | 9/2012 | Montaron et al. |
| 8,301,427 B2 | 10/2012 | Souche et al. |
| 8,374,836 B2 | 2/2013 | Yogeswaren |
| 8,498,848 B2 | 7/2013 | Habashy et al. |
| 8,548,782 B2 | 10/2013 | Hsu et al. |
| 8,619,500 B2 | 12/2013 | Gray |
| 8,649,980 B2 | 2/2014 | Gulati |
| 8,756,016 B2 | 6/2014 | Tabanou et al. |
| 8,780,671 B2 | 7/2014 | Sayers |
| 8,898,046 B2 | 11/2014 | Moos et al. |
| 9,022,140 B2 | 5/2015 | Marx et al. |
| 9,062,545 B2 | 6/2015 | Roberts et al. |
| 9,063,251 B2 | 6/2015 | Moos |
| 9,068,448 B2 | 6/2015 | Hui et al. |
| 9,110,190 B2 | 8/2015 | Yogeswaren |
| 9,152,745 B2 | 10/2015 | Glinsky |
| 9,305,121 B2 | 4/2016 | Yao et al. |
| 9,390,204 B2 | 7/2016 | Bowen et al. |
| 9,417,348 B2 | 8/2016 | Lin |
| 9,435,192 B2 | 9/2016 | Lawrence et al. |
| 9,465,140 B2 | 10/2016 | Crawford et al. |
| 9,618,652 B2 | 4/2017 | Weng et al. |
| 9,677,393 B2 | 6/2017 | Morris |
| 9,846,260 B2 | 12/2017 | Mallet |
| 9,946,986 B1* | 4/2018 | Saleri .............. G06Q 10/06315 |
| 9,988,895 B2 | 6/2018 | Roussel et al. |
| 10,001,003 B2 | 6/2018 | Dusseault et al. |
| 10,101,498 B2 | 10/2018 | Berard et al. |
| 10,190,406 B2 | 1/2019 | Holland et al. |
| 10,302,785 B2 | 5/2019 | Dirksen et al. |
| 10,310,137 B1 | 6/2019 | Mallet |
| 10,352,145 B2 | 7/2019 | Maxwell et al. |
| 10,422,208 B2 | 9/2019 | Weng et al. |
| 10,465,509 B2 | 11/2019 | Yao et al. |
| 10,528,681 B2 | 1/2020 | Yogeswaren |
| 10,563,493 B2 | 2/2020 | Ganguly et al. |
| 10,571,605 B2 | 2/2020 | Crawford et al. |
| 10,572,611 B2 | 2/2020 | Huang et al. |
| 10,607,043 B2 | 3/2020 | Camargo et al. |
| 10,724,346 B2 | 7/2020 | Eftekhari Far et al. |
| 10,760,416 B2 | 9/2020 | Weng et al. |
| 10,787,887 B2 | 9/2020 | Pankaj et al. |
| 10,846,447 B2* | 11/2020 | Myers .................... G01V 20/00 |
| 10,853,533 B2 | 12/2020 | Plateaux et al. |
| 10,920,538 B2 | 2/2021 | Rodriguez Herrera et al. |
| 10,920,552 B2 | 2/2021 | Rodriguez Herrera et al. |
| 11,098,582 B1 | 8/2021 | Camargo et al. |
| 11,180,975 B2 | 11/2021 | Renaudeau et al. |
| 11,187,071 B2 | 11/2021 | Luo et al. |
| 11,313,994 B2* | 4/2022 | Salman .................... G01V 1/50 |
| 11,353,621 B2 | 6/2022 | Khan et al. |
| 11,434,759 B2 | 9/2022 | Awan et al. |
| 11,599,790 B2* | 3/2023 | Pandey .................. G06N 3/045 |
| 11,834,931 B2 | 12/2023 | Guillot et al. |
| 2007/0100594 A1 | 5/2007 | Lamoureux-Var et al. |
| 2007/0255545 A1 | 11/2007 | Pita et al. |
| 2007/0272407 A1* | 11/2007 | Lehman .................. E21B 43/26 166/308.1 |
| 2008/0071505 A1 | 3/2008 | Huang et al. |
| 2009/0032250 A1 | 2/2009 | Sarkar et al. |
| 2009/0299637 A1 | 12/2009 | Dasgupta |
| 2009/0319243 A1 | 12/2009 | Suarez-Rivera et al. |
| 2010/0138196 A1 | 6/2010 | Hui et al. |
| 2010/0191470 A1 | 7/2010 | Tabanou et al. |
| 2010/0250216 A1 | 9/2010 | Narr et al. |
| 2012/0072188 A1 | 3/2012 | Maerten et al. |
| 2013/0046524 A1 | 2/2013 | Gathogo et al. |
| 2013/0054207 A1 | 2/2013 | Souche et al. |
| 2013/0282348 A1 | 10/2013 | Liu |
| 2013/0297269 A1 | 11/2013 | Davies et al. |
| 2013/0299241 A1 | 11/2013 | Alberty et al. |
| 2013/0312974 A1 | 11/2013 | Mcclung, IV |
| 2014/0358510 A1 | 12/2014 | Sarkar et al. |
| 2015/0129211 A1 | 5/2015 | Dusseault et al. |
| 2015/0276979 A1 | 10/2015 | Hugot et al. |
| 2015/0315485 A1 | 11/2015 | Morris |
| 2016/0070024 A1 | 3/2016 | Berard et al. |
| 2016/0222765 A1 | 8/2016 | Nooruddin et al. |
| 2016/0245939 A1 | 8/2016 | Williams |
| 2016/0266274 A1 | 9/2016 | Alqam et al. |
| 2016/0266278 A1 | 9/2016 | Holderby et al. |
| 2016/0281498 A1 | 9/2016 | Nguyen et al. |
| 2017/0038489 A1 | 2/2017 | Pandey et al. |
| 2017/0051598 A1 | 2/2017 | Ouenes |
| 2017/0132339 A1 | 5/2017 | Umholtz et al. |
| 2017/0145793 A1 | 5/2017 | Ouenes |
| 2017/0160429 A1 | 6/2017 | Berard et al. |
| 2017/0176228 A1 | 6/2017 | Elisabeth |
| 2017/0205531 A1 | 7/2017 | Berard et al. |
| 2017/0254909 A1 | 9/2017 | Agharazi |
| 2017/0316128 A1 | 11/2017 | Huang et al. |
| 2018/0203146 A1 | 7/2018 | Den Boer et al. |
| 2019/0080122 A1* | 3/2019 | Camargo ................ G06F 30/20 |
| 2019/0345815 A1 | 11/2019 | Mishra |
| 2020/0056460 A1 | 2/2020 | Isaev et al. |
| 2020/0095858 A1 | 3/2020 | Bouaouaja et al. |
| 2020/0141215 A1 | 5/2020 | Crews et al. |
| 2020/0158898 A1 | 5/2020 | Le Guern et al. |
| 2020/0225382 A1 | 7/2020 | Mallet et al. |
| 2020/0225383 A1 | 7/2020 | Mallet et al. |
| 2020/0326322 A1 | 10/2020 | Farrukh Hamza |
| 2020/0348445 A1 | 11/2020 | Liu et al. |
| 2021/0054736 A1 | 2/2021 | Moos et al. |
| 2021/0102461 A1 | 4/2021 | Kumar et al. |
| 2021/0132246 A1* | 5/2021 | Liu ........................ G01V 1/282 |
| 2021/0140313 A1 | 5/2021 | Busetti |
| 2021/0222518 A1 | 7/2021 | Bardy et al. |
| 2021/0350052 A1 | 11/2021 | Alwahtani et al. |
| 2022/0018245 A1* | 1/2022 | Coenen .................. G01V 20/00 |
| 2022/0114302 A1 | 4/2022 | Skripkin |
| 2022/0291418 A1 | 9/2022 | Noufal |
| 2023/0012429 A1 | 1/2023 | Camargo et al. |
| 2023/0084141 A1 | 3/2023 | Camargo et al. |
| 2023/0333278 A1* | 10/2023 | Camargo ................ G01V 20/00 |

FOREIGN PATENT DOCUMENTS

| | | |
|---|---|---|
| AU | 2023285757 A1 | 1/2024 |
| BR | PI1003737 A2 | 3/2012 |
| CA | 2771698 C | 3/2011 |
| CA | 2778313 A1 | 6/2011 |
| CA | 2771626 C | 2/2014 |
| CA | 2904008 A1 | 9/2014 |
| CA | 2932670 A1 | 12/2017 |
| CA | 3043231 A1 | 6/2018 |
| CN | 102042010 B | 1/2014 |
| CN | 102788994 B | 1/2015 |
| CN | 104459775 B | 3/2015 |
| CN | 104500050 A | 5/2015 |
| CN | 105403929 A | 3/2016 |
| CN | 105484741 A | 4/2016 |
| CN | 103064114 B | 5/2016 |
| CN | 106285659 A | 1/2017 |
| CN | 104615896 B | 5/2017 |
| CN | 106971269 A | 7/2017 |
| CN | 104992468 B | 1/2018 |
| CN | 105134156 B | 5/2018 |
| CN | 108331555 A | 7/2018 |
| CN | 105378651 B | 9/2018 |
| CN | 107578343 B | 7/2020 |
| CN | 107577831 B | 8/2020 |
| CN | 110850057 B | 4/2021 |
| CN | 112253103 B | 8/2021 |

(56) References Cited

FOREIGN PATENT DOCUMENTS

| | | |
|---|---|---|
| CN | 112065351 B | 9/2021 |
| CN | 113534291 A | 10/2021 |
| CN | 109102180 B | 11/2021 |
| CN | 112526107 B | 11/2021 |
| CN | 109388817 B | 2/2022 |
| CN | 114153002 A | 3/2022 |
| CN | 115166853 A | 10/2022 |
| CN | 115618274 A | 1/2023 |
| EP | 3118758 A1 | 1/2017 |
| EP | 2179134 B1 | 1/2018 |
| EP | 3682090 A1 | 7/2020 |
| EP | 3074957 B1 | 2/2022 |
| EP | 4042211 | 8/2022 |
| EP | 4292008 A1 | 12/2023 |
| FR | 2979016 A | 2/2013 |
| KR | 101620506 B1 | 5/2016 |
| KR | 101811858 B1 | 12/2017 |
| KR | 102111207 B1 | 5/2020 |
| RU | 2404359 C2 | 11/2010 |
| WO | 2010111398 A2 | 9/2010 |
| WO | 2013169256 A1 | 11/2013 |
| WO | 2015168417 A1 | 11/2015 |
| WO | 2016122792 A1 | 8/2016 |
| WO | 2016209822 A1 | 12/2016 |
| WO | 2017019388 A1 | 2/2017 |
| WO | 2017216594 A1 | 12/2017 |
| WO | 2019238451 A1 | 12/2019 |
| WO | 2020167282 A1 | 8/2020 |
| WO | 2020198210 A1 | 10/2020 |
| WO | 2021108439 A1 | 6/2021 |
| WO | 2021236877 A1 | 11/2021 |
| WO | 2022174262 A1 | 8/2022 |
| WO | 2023130074 A1 | 7/2023 |
| WO | 2024003599 A1 | 1/2024 |

OTHER PUBLICATIONS

Wickham, John et al.; "Geomechanics of Fracture Density" URTeC Control ID: 1619745, Unconventional Resources Tech Conf. (2013); pp. 1-9.
Zastoupil, Louis Brett; "A Geomechanical Equation for Fracture Density/Brittleness and Comparisons with a Mineralogical Brittleness Index" Masters Thesis, U. Texas at Arlington (2015); pp. 1-139.
Gan, Quan et al.; "A continuum model for coupled stress and fluid flow in discrete fracture networks" Geomech. Geophys. Geo-energ. Geo-resour. (2016); pp. 2:43-2:61.
Ge, Jun et al.; "Semianalytical modeling on 3D stress redistribution during hydraulic fracturing stimulation and its effects on natural fracture reactivation" Int J Numer Anal Methods Geomech. (2020) / V. 44, / 8; pp. 1184-1199.
Gray, F. David et al.; "Fracture detection in the Manderson Field: A 3D AVAZ case history" Society of Exploration Geophysicists, Jan. 5, 2005; pp. 1-4.
Gunn, P.J.; "Linear Transformations of Gravity and Magnetic Fields" Geophysical Prospecting vol. 23, Issue 2, Jun. 1974; pp. 300-312.
Han, Jiahang et al.; "Stress Field Change Due to Reservoir Depletion and Its Impact on Refrac Treatment Design and SRV in Unconventional Reservoirs" SPE-178496-MS/URTeC:2144941; Unconventional Resources Tech. Conf., Texas, Jul. 20-22, 2015; pp. 1-11.
Herwanger, J.; "Seismic Geomechanics, How to Build and Calibrate Geomechanical Models using 3D and 4D Seismic Data" 1 Edn., EAGE Publications b.v. Houten, 2011; pp. 1-219 (in 3 parts).
Huang, Jian et al.; "Natural-hydraulic fracture interaction: Microseismic observations and geomechanical predictions" (abstract only) Interpretation (2015) 3 (3); pp. SU17-SU31.
International Search Report and Written Opinion for International Application No. PCT/US2018/046824 report mail date Nov. 28, 2018; pp. 1-13.
International Search Report and Written Opinion for International Application No. PCT/US2020/062069, report mail date Mar. 11, 2021; pp. 1-18.
International Search Report and Written Opinion for International Application No. PCT/US2021/018379 report mail date May 28, 2021; pp. 1-16.
Jacquemyn, Carl et al.; "Mechanical stratigraphy and (paleo-) karstification of the Murge area (Apulia, southern Italy)" Geological Society, London, Special Publications 2012, vol. 370; pp. 169-186.
Jiang, Le et al.; "Simulation and Optimization of Dynamic Fracture Parameters for an Inverted Square Nine-Spot Well Pattern in Tight Fractured Oil Reservoirs" Hindawi, Geofluids, vol. 2020, Article ID 8883803; pp. 1-9.
Jorgensen, Bo Barker et al.; "Bacterial Sulfate Reduction Above 100C in Deep-Sea Hydrothermal Vent Sediments" (Abstract only) Science, vol. 258, Issue 5089, Dec. 11, 1992; pp. 1756-1757.
Kayode, B. et al.; "Advances in Reservoir Modeling: A New Approach for Building Robust Reservoir Models" (abstract only) SPE-187993-MS, SPE KSA Annual Technical Symposium and Exhibition, Dammam, Saudi Arabia, Apr. 2017; pp. 1-6.
Khadivi, Kourosh et al.; "Integrated fracture characterization of Asmari reservoir in Haftkel field" Journal of Petroleum Exploration and Production Technology, Jan. 4, 2022; pp. 1-21.
Koutsabeloulis, N.C. et al.; "Numerical geomechanics in reservoir engineering" Computer Methods and Advances in Geomechanics, A.A. Balkema, Rotterdam, The Netherlands, 1994; pp. 2097-2104.
Lei, Qinghua et al.; "The use of discrete fracture networks for modelling coupled geomechanical and hydrological behaviour of fracture rocks" Computers and Geotechnics 85 (2017); pp. 151-176.
Li, Yu et al.; "Constructing of 3D Fluvial Reservoir Model Based on 2D Training Images" Applied Sciences (2023) 13; pp. 1-13.
Liao, Zonghu et al.; "Characterizing damage zones of normal faults using seismic variance in the Wangxuzhuang Oilfield, China", Interpretation / Nov. 2020; pp. 1-8.
Liu, Naizhen et al.; "Shale gas sweet spot identification and precise geo-steering drilling in Weiyuan Block of Sichuan Basin, SW China" Petroleum Exploration and Development, vol. 43, Issue 6, Dec. 2016; pp. 1-9.
Ahmadi, Mohammad Ali; "Toward Reliable Model for Prediction Drilling Fluid Density at Wellbore Conditions: A LSSVM Model" Department of Petroleum Engineering, Ahwaz Faculty of Petroleum Engineering; pp. 1-34.
Akhmetova, A.A. et al.; "Evaluation of the applicability mini-fracturing data to determine reservoir pressure and transmissibility (Russian)." OIJ 2018 (2018); pp. 90-94.
Aksenov, A.A. et al.; "Prediction of Distribution of Hydrogen Sulfide in Oil-Gas Basins" Petroleum Geology: A digest of Russian literature on Petroleum Geology; vol. 16 (1979), No. 10 (October); pp. 439-441.
Al-Hawas, Khalid et al.; Delineation of fracture anisotropy signatures in Wudayhi Field by azimuthal seismic data; The Leading Edge, Interpreter's Corner, Dec. 2003; pp. 1202-1211.
Al-Nutaifi et al.; "Wellbore Instability Analysis for Highly Fractured Carbonate Gas Reservoir from Geomechanics Prospective, Saudi Arabia Case Study" International Petroleum Technology Conference, Kuala Lumpur, Malaysia, Dec. 10-12, 2014; pp. 1-10.
Alcantara, Ricardo et al.; "A Dynamic Characterization Approach for a Complex Naturally Fractured Reservoir" International Petroleum Technology Conference, Beijing, China, Mar. 26-28, 2019; pp. 1-40.
Aldrich, Jeffrey B. et al.; "Sweet Spot' Identification and Optimization in Unconventional Reservoirs" Search and Discovery Article #80644 (2018); pp. 1-6.
ArcGIS Pro 2.8; "An overview of the Density toolset" available as of Apr. 4, 2022 at: https://pro.arcgis.com/en/pro-app/2.8/tool-reference/spatial-analyst/an-overview-of-the-density-tools.htm; p. 1.
ArcGIS Pro 2.8; "How Kernel Density Works" Available as of Mar. 14, 2022 at: https://pro.arcgis.com/en/pro-app/2.8/tool-reference/spatial-analyst/how-kernel-density-works.htm; pp. 1-6.
ArcGIS Pro 2.8; "Kernel Density (Spatial Analyst)" available as of Mar. 14, 2022 at: https://pro.arcgis.com/en/pro-app/2.8/tool-reference/spatial-analyst/kernel-density.htm; pp. 1-5.
ArcGIS Pro 2.8; "Line Density (Spatial Analyst)" available as of Apr. 4, 2022 at: https://pro.arcgis.com/en/pro-app/2.8/tool-reference/spatial-analyst/line-density.htm; pp. 1-6.

(56) References Cited

OTHER PUBLICATIONS

ArcGIS Pro 2.8; "Point Density (Spatial Analyst)" available as of Apr. 4, 2022 at: https://pro.arcgis.com/en/pro-app/2.8/tool-reference/spatial-analyst/point-density.htm; pp. 1-7.

ArcGIS; "How Kernel Density works" available as of Jan. 28, 2022 at: https://desktop.arcgis.com/en/arcmap/10.6/tools/spatial-analyst-toolbox/how-kernel-density-works.htm; pp. 1-3.

ArcGIS; "How Line Density works" available as of Jan. 18, 2022 at: https://desktop.arcgis.com/en/arcmap/10.6/tools/spatial-analyst-toolbox/how-line-density-works.htm; pp. 1-3.

Azari, Mehdi et al.; "Determining the Formation Properties with Innovative Formation Integrity Test Designed Using a Wireline Straddle Packer, a Field Example" SPWLA 59th Annual Logging Symposium, Jun. 2-6, 2018; pp. 1-12.

Barree, R.D. et al.; "Holistic Fracture Diagnostics" SPE 107877, Rocky Mountain Oil & Gas Technology Symposium, Denver, CO, Apr. 16-18, 2007; pp. 1-13.

Barton, Colleen A. et al.; "Fluid flow along potentially active faults in crystalline rock" Geology; Aug. 1995; v.23; No. 8; pp. 683-686.

Bisdom, Kevin et al.; "A geometrically based method for predicting stress-induced fracture aperture and flow in discrete fracture networks" AAPG Bulletin v. 100, No. 7 (Jul. 2016); pp. 1075-1097.

Bisdom, Kevin et al.; "The impact of in-situ stress and outcrop-based fracture geometry on hydraulic aperture and upscaled permeability in fractured reservoirs" (abstract only) Tectonphysics v. 690, Part A, Oct. 28, 2010; pp. 63-75.

Blakely, Richard J.; "Potential Theory in Gravity and Magnetic Applications" Cambridge University Press, 1996; pp. 1-9.

Camargo, Otto E. Meza et al.; "Reservoir Stress Path from 4D Coupled High Resolution Geomechanics Model: A Case Study for Jauf Formation, North Ghawar, Saudi Arabia" Saudi Aramco Journal of Technology, Fall 2016; pp. 45-59.

Cao, Yang-Bing et al.; "Calculation Method and Distribution Characteristics of Fracture Hydraulic Aperture from Field Experiments in Fractured Granite Area" (abstract only), Springer Ling, Nov. 9, 2015; pp. 1-18.

Cappa, F. et al.; "Estimation of fracture flow parameters through numerical analysis of hydromechanical pressure pulses" Water Resources Research, American Geophysical Union, 2008, 44, pp. W11408; pp. 1-49.

Chen, Sheng et al.; "Prediction of sweet spots in shale reservoir based on geophysical well logging and 3D seismic data" Energy Exploration & Exploitation, vol. 35(2), 2017; pp. 147-171.

De Buyl, M. et al.; "Reservoir Description From Seismic Lithologic Parameter Estimation" (abstract only) Journal of Petroleum Technology 40 (1988); pp. 475-482.

Engelder, Terry et al.; "Chapter 15: A Pore-Pressure Limit in Overpressured South Texas Oil and Gas Fields" pp. 255-267, AAPG Memoir 67, 1997; pp. 255-267.

Ferreira, Francisco J.F. et al.; "Enhancement of the total horizontal gradient of magnetic anomalies using the tilt angle" Geophysics vol. 78, No. 3 (May-Jun. 2013); pp. J33-J41.

Fischer, K. et al.; "A workflow for building and calibrating 3-D geomechoanical models—a case study for a gas reservoir in the North German Basin" Solid Earth, 4, (2013); pp. 347-355.

Fischer, K. et al.; "Generating and Calibrating 3D Geomechanical Reservoir Models" 75th EAGE Conference and Exhibition incorporating SPE Europec 2013, London UK, Jun. 10-13, 2013; pp. 1-5.

Friedman, Jerome H.; "Greedy Function Approximation: A Gradient Boosting Machine" 1999 Reitz Lecture, The Annals of Statistics (2001), vol. 29, No. 5; pp. 1189-1232.

Liu, Shiqi et al.; "Geological and Engineering Integrated Shale Gas Sweet Spots Evaluation Based on Fuzzy Comprehensive Evaluation Method: A Case Study of Z Shale Gas Field HB Block" Energies 2022, 15, 602, Jan. 14, 2022; pp. 1-20.

Luthi, S.M. et al.; "Fracture apertures from electrical borehole scans" Geophysics, vol. 55, No. 7 (Jul. 1990); pp. 821-833.

Min, Ki-Bok et al.; "Stress-Dependent Permeability of Fractured Rock Masses: A Numerical Study" International Journal of Rock Mechanics and Mining Sciences, vol. 41, Issue 7 (2004); pp. 1191-1210.

Ouenes, Ahmed; "Stress Modeling '3-G' Workflow Pinpoints Shale Sweet Spots" The American Oil & Gas Reporter, Jul. 2015; pp. 1-3.

Silverman, B.W.; "Density Estimation for Statistics and Data Analysis" Monographs on Statistics and Applied Probability, London: Chapman and Hall, 1986; pp. 1-22.

Tokhmchi, Behzad et al.; "Estimation of the fracture density in fractured zones using petrophysical logs" Journal of Petroleum Science and Engineering 72 (2010); pp. 206-213.

Maerten, F.; "Adaptive cross-approximation applied to the solution of system of equations and post-Processing for 3D elastostatic problems using the boundary element Method" Engineering Analysis with Boundary Elements 34, 2010; pp. 483-491.

Matyasik, Irena et al.; "Genesis of hydrogen sulfide in carbonate reservoirs" Nafta-Gaz, ROK LXXIV, NR Sep. 2018; pp. 627-635.

Meng, Fanle et al.; "Numerical Simulation of Fracture Flow Interaction Based on Discrete Fracture Model" Processes (2023), 11, 3013; pp. 1-19.

Meza, O. et al.; "Integration of Borehole Image Logs and Rock Mechanics for Critically Stressed Fractures Analysis in Weak Carbonates" (abstract only) 2nd EAGE Borehole Geology Workshop, Oct. 2017, vol. 2017; pp. 1-5.

Miller, Hugh G. et al.; "Potential field tilt—a new concept for location of potential field sources" Journal of Applied Geophysics 32 (1994); pp. 213-217.

Mojeddifar, Saeed et al.; "Porosity prediction from seismic inversion of a similarity attribute based on a pseudo-forward equation (PFE): a case study from the North Sea Basin, Netherlands" Pet. Sci. (2015) 12; pp. 428-442.

Nejadi, Siavash et al.; "History matching and uncertainty quantification of discrete fracture network models in fractured reservoirs" Journal of Petroleum Science and Engineering 152 (2017); pp. 21-32.

Nolte, K.G. et al.; "After-Closure Analysis of Fracture Calibration Tests" SPE 38676, 1997 SPE Annual Technical Conference and Exhibition, San Antonio, TX, Oct. 5-8, 1997; pp. 333-349.

Nvidia; "XGBoost—What Is It and Why Does it Matter?" available as of Aug. 3, 2023 at: https://www.nvidia.com/en-us/glossary/data-science/xgboost/; pp. 1-7.

Ochie, Karen Ifeoma et al.; "Geostatistics—Kriging and Co-Kriging Methods in Reservoir Characterization of Hydrocarbon Rock Deposits" SPE-193483-MS, Nigeria Annual International Conference & Exhibition, Lagos, Nigeria, Aug. 6-8, 2018; pp. 1-11.

Orr, Wilson L.; "Changes in Sulfur Content and Isotopic Ratios of Sulfur during Petroleum Maturation—Study of Big Horn Basin Paleozoic Oils" The American Association of Petroleum Geologists Bulletin, V. 58, No. 11 (Nov. 1974); pp. 2295-2318.

Phillips, Jeffrey D. et al.; "Sources of Magnetic Anomalies over a Sedimentary Basin: Preliminary Results from the Coastal Plain of the Arctic National Wildlife Refuge, Alaska*" Geologic Apps of Gravity and Magnetics: Case Histories, 1998; pp. 130-134.

Phillips, Jeffrey D.; "Designing matched bandpass and azimuthal filters for the separation of potential-field anomalies by source region and source type" ASEG 15th Geophysical Conference and Exhibition, Aug. 2001, Brisbane; pp. 1-4.

Rezmer-Cooper, Iain M. et al.; "Real-Time Formation Integrity Tests Using Downhole Data" IADC/SPE 59123, 2000 IASC/SPE Drilling Conference, New Orleans, LA, Feb. 23-25, 2000; pp. 1-12.

Rogers S. et al, "Integrating discrete fracture network models and pressure transient data for testing conceptual fracture models of the Valhall chalk reservoir, Norway North Sea"; Geological Society, London, Special Publications, 270, 2007, pp. 187-197.

Rogers, Stephen F.; "Critical stress-related permeability in fractured rocks", Chpt 2, Fracture and In-Situ Stress Characterization of Hydrocarbon Reservoirs, (AMEEN) Geoscience World, The Geological Society of London, Jan. 1, 2003; pp. 7-16.

Schlumberger; "Welcome to Techlog online help Feb. 2018" 2018; pp. 1-2.

(56) References Cited

OTHER PUBLICATIONS

Schultz, Ryan et al.; "The Cardston Earthquake Swarm and Hydraulic Fracturing of the Exshaw Formation (Alberta Bakken Play)" Bulletin of the Seismological Society of America, vol. 105, No. 6, Dec. 2015; pp. 1-14.

Shimizu, Hiroyuki et al.; "A study of the effect of brittleness on hydraulic fracture complexity using a flow-coupled discrete element method" Journal of Petroleum Science & Engineering 160 (2018); pp. 372-383.

Sorkhabi, Rasoul, Ph.D.; "Locating Sweet Spots: Shale Petroleum Systems" available as of Dec. 28, 2021 at: https://www.geoexpro.com/articles/2020/06/locating-sweet-spots-shale-petroleum-systems; vol. 17, No. 2—2020; pp. 1-10.

Spector, A. et al.; "Statistical Models for Interpreting Aeromagnetic Data" Geophysics, vol. 35, No. 2, Apr. 1970; pp. 293-302.

Tian, Fei et al.; "Three-Dimensional Geophysical Characterization of Deeply Buried Paleokarst System in the Tahe Oilfield, Tarim Basin, China" Water (2019) 11, 1045; pp. 1-18.

U.S. Appl. No. 16/792,742 titled "Determination of Calibrated Minimum Horizontal Stress Magnitude Using Fracture Closure Pressure and Multiple Mechanical Earth Model Realizations" filed Sep. 17, 2021.

U.S. Appl. No. 17/463,153 titled "Determining Hydrogen Sulfide (H2S) Concentration and Distribution in Carbonate Reservoirs Using Geomechanical Properties" filed Aug. 31, 2021.

U.S. Appl. No. 17/476,914 titled "Identifying Fluid Flow Paths in Naturally Fractured Reservoirs" filed Sep. 16, 2021.

U.S. Appl. No. 17/690,484 titled "Geo-Mechanical Based Determination of Sweet Spot Intervals for Hydraulic Fracturing Stimulation" filed Mar. 9, 2022.

U.S. Appl. No. 17/712,820 titled "System and Method to Develop Naturally Fractured Hydrocarbon Reservoirs Using a Fracture Density Index" filed Apr. 4, 2022.

U.S. Appl. No. 17/721,064 titled "Identifying Naturally Fractured Sweet Spots Using a Fracture Density Index (FDI)" filed Apr. 14, 2022.

Van Lanen, Xavier et al.; "Integrated geologic and geophysical studies of North American continental intraplate seismicity" The Geological Society of America, Special Paper 425, 2007; pp. 101-112.

Wikipedia; "Kernel density estimation" available as of Apr. 4, 2022 at: https://en.wikipedia.org/wiki/Kernel_density_estimation#:~:text=In statistics%2C kernel density estimation,on a finite data sample; pp. 1-12.

Wilson, Adam; "Common Mistakes Associated with Diagnostic Fracture Injection Tests" Journal of Petroleum Technology, Aug. 31, 2014; pp. 1-6.

Worden, R.H. et al.; "Gas Souring by Thermochemical Sulfate Reduction by 140C1" The American Association of Petroleum Geologists Bulletin, V. 79, No. 6 (Jun. 1995); pp. 854-863.

Worden, Richard H. et al.; "Origin of H2S in Khuff Reservoirs by Thermochanical Sulfate Reduction: Evidence from Fluid Inclusions" Saudi Aramco Journal of Technology, Fall 2004; pp. 42-52.

Wynants-Morel, Nicolas et al.; "Stress Perturbation From Aseismic Slip Drives the Seismic Front During Fluid Injection in a Permeable Fault" JGR Solid Earth vol. 125, Issue 7, Jul. 2020; pp. 1-23.

XGBoost Tutorials; "Introduction to Boosted Trees" available as of Aug. 3, 2023 at: https://xgboost.readthedocs.io/en/stable/tutorials/model.html; pp. 1-10.

Zellou, Abdel et al.; "Fractured Reservoir Characterization Using Post-Stack Seismic Attributes: Application to a Hungarian Reservoir", EAGE 68th Conference & Exhibition—Vienna, Austria, Jun. 12-15, 2006; pp. 1-4.

Zeng, Qingdong et al.; "Numerical Simulation of Fluid-Solid Coupling in Fractured Porous Media with Discrete Fracture Model and Extended Finite Element Method" Computation (2015), 3; pp. 541-557.

Zhu, GuangYou et al.; "The controlling factors and distribution prediction of H2S formation in marine carbonate gas reservoir, China" (abstract only) Chinese Science Bulletin, vol. 52 (2007), pp. 150-163.

Zoback, Mark D.; "Critically stressed faults and fluid flow" Reservoir Geomechanics Chapter 11, Cambridge University Press, New York, 2007, pp. 1-21.

\* cited by examiner

BUILDING NATURAL FRACTURES MODEL USING 3D STACKED GEOLOGICAL MODELS

BACKGROUND

Field of the Disclosure

The present disclosure generally relates to developing hydrocarbon reservoirs. More specifically, embodiments of the disclosure relate to locating and drilling wells and other operations based on assessment and modeling of natural fractures in hydrocarbon reservoirs.

Description of the Related Art

A rock formation that resides under the Earth's surface is often referred to as a "subsurface" formation. A subsurface formation that contains a subsurface pool of hydrocarbons, such as oil and gas, is often referred to as a "hydrocarbon reservoir." Hydrocarbons are typically extracted (or "produced") from a hydrocarbon reservoir by way of a hydrocarbon well. A hydrocarbon well normally includes a wellbore (or "borehole") that is drilled into the reservoir. The extraction of hydrocarbon resources from reservoirs in rock formations may depend on a variety of factors. Some reservoirs may present particular challenges with respect to hydrocarbon extraction and related operations, such as drilling and hydraulic fracturing. Naturally fractured reservoirs may present such challenges.

SUMMARY

The construction of three-dimensional (3D) natural fracture models for oil and gas reservoirs generally uses multi-disciplinary datasets as inputs in order to have a comprehensive understanding of the natural fracture distribution and orientation, and reliable quantification of fracture porosity and permeability. Such datasets may include borehole image logs, acoustic logs, rock mechanics tests and others. However, data acquisition programs are typically focused on primary reservoir targets, leaving secondary reservoir targets with incomplete datasets for future characterization and development.

Embodiments of the disclosure are directed to 3D natural fractures models of secondary reservoirs identified in the field, utilizing the outcomes of the main reservoir within a stacked 3D geological model. The stacking fracture modeling process described in the disclosure may can be applied to structures that contain stacked reservoirs of different age sharing the same paleo tectonic history. Under these conditions, the fracture distribution across all different stratigraphic levels in a structure may be modeled, including the data-restricted secondary reservoirs by using a primary reservoir fracture model.

In one embodiment, a method for developing a naturally fractured reservoir is provided. The method includes obtaining a plurality of reservoir parameters representing a respectively plurality of properties of a primary naturally fractured reservoir, determining a stacked geological model extending from the primary naturally fractured reservoir to a secondary naturally fractured reservoir, and determining a geomechanical model using the obtained plurality of reservoir parameters and the stacked geological model. The method also includes forming a primary natural fracture model by processing the obtained plurality of reservoir parameters and a plurality of petrophysical properties from the geological model to identify the presence and extent of natural fractures at locations in the primary naturally fractured reservoir and extracting a plurality of parameters from the primary natural fracture model for the primary naturally fractured reservoir. The method further includes constructing a secondary fracture model for the secondary naturally fractured reservoir using the extracted plurality of parameters to identify the presence and extent of natural fractures at locations in the secondary naturally fractured reservoir.

In some embodiments, the reservoir parameters include seismic attributes from seismic surveys of a subsurface geological structure. In some embodiments, the reservoir parameters include rock and mechanical properties from a geological model of a subsurface geological structure. In some embodiments, the reservoir parameters include a structural model of a subsurface geological structure. In some embodiments, the reservoir parameters include a paleo-stress regime of a subsurface geological structure. In some embodiments, the plurality of parameters include a deformation model, a brittleness index, and a stress model. In some embodiments, the method includes determining a deformation model for use in the geomechanical model. In some embodiments, the method includes identifying a location in the secondary naturally fractured reservoir using the second fracture model and drilling a well in a subsurface geological structure at the location in the secondary naturally fractured reservoir.

In another embodiment, a non-transitory computer-readable storage medium having executable code stored thereon for developing a naturally fractured reservoir is provided. The executable code includes a set of instructions that causes a processor to perform operations that include obtaining a plurality of reservoir parameters representing a respectively plurality of properties of a primary naturally fractured reservoir, determining a stacked geological model extending from the primary naturally fractured reservoir to a secondary naturally fractured reservoir, and determining a geomechanical model using the obtained plurality of reservoir parameters and the stacked geological model. The operations also include forming a primary natural fracture model by processing the obtained plurality of reservoir parameters and a plurality of petrophysical properties from the geological model to identify the presence and extent of natural fractures at locations in the primary naturally fractured reservoir and extracting a plurality of parameters from the primary natural fracture model for the primary naturally fractured reservoir. The operations further include constructing a secondary fracture model for the secondary naturally fractured reservoir using the extracted plurality of parameters to identify the presence and extent of natural fractures at locations in the secondary naturally fractured reservoir.

In some embodiments, the reservoir parameters include seismic attributes from seismic surveys of a subsurface geological structure. In some embodiments, the reservoir parameters include rock and mechanical properties from a geological model of a subsurface geological structure. In some embodiments, the reservoir parameters include a structural model of a subsurface geological structure. In some embodiments, the reservoir parameters include a paleo-stress regime of a subsurface geological structure. In some embodiments, the plurality of parameters include a deformation model, a brittleness index, and a stress model. In some embodiments, the operations include determining a deformation model for use in the geomechanical model. In some embodiments, the operations include identifying a location in the secondary naturally fractured reservoir using the second fracture model and controlling a drilling operation to drill a well in a subsurface geological structure at the location in the secondary naturally fractured reservoir.

In another embodiment, a system for developing a developing a naturally fractured reservoir is provided. The system includes a processor and a non-transitory computer-readable memory accessible by the processor and having executable code stored thereon. The executable code includes a set of instructions that causes the processor to perform operations that include obtaining a plurality of reservoir parameters representing a respectively plurality of properties of a primary naturally fractured reservoir, determining a stacked geological model extending from the primary naturally fractured reservoir to a secondary naturally fractured reservoir, and determining a geomechanical model using the obtained plurality of reservoir parameters and the stacked geological model. The operations also include forming a primary natural fracture model by processing the obtained plurality of reservoir parameters and a plurality of petrophysical properties from the geological model to identify the presence and extent of natural fractures at locations in the primary naturally fractured reservoir and extracting a plurality of parameters from the primary natural fracture model for the primary naturally fractured reservoir. The operations further include constructing a secondary fracture model for the secondary naturally fractured reservoir using the extracted plurality of parameters to identify the presence and extent of natural fractures at locations in the secondary naturally fractured reservoir.

In some embodiments, the reservoir parameters include seismic attributes from seismic surveys of a subsurface geological structure. In some embodiments, the reservoir parameters include rock and mechanical properties from a geological model of a subsurface geological structure. In some embodiments, the reservoir parameters include a structural model of a subsurface geological structure. In some embodiments, the reservoir parameters include a paleo-stress regime of a subsurface geological structure. In some embodiments, the plurality of parameters include a deformation model, a brittleness index, and a stress model. In some embodiments, the operations include determining a deformation model for use in the geomechanical model. In some embodiments, the operations include identifying a location in the secondary naturally fractured reservoir using the second fracture model and controlling a drilling operation to drill a well in a subsurface geological structure at the location in the secondary naturally fractured reservoir.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

The present disclosure will be described more fully with reference to the accompanying drawings, which illustrate embodiments of the disclosure. This disclosure may, however, be embodied in many different forms and should not be construed as limited to the illustrated embodiments. Rather, these embodiments are provided so that this disclosure will be thorough and complete, and will fully convey the scope of the disclosure to those skilled in the art.

Embodiments of the disclosure are directed to constructing a natural fracture model of a secondary reservoir in a field by using the information from a primary reservoir within a stacked 3D geological model. A fracture model may be constructed for a primary reservoir that incorporates a specific paleo-stress regime and information from a stacked 3D geological model, a deformation model, and a geomechanical model. Parameters such as a deformation model, brittleness index, and stress model may be extracted from the fracture model for a primary reservoir. A fracture model for the secondary reservoir is then constructed from the extracted parameters.

Figure 1:
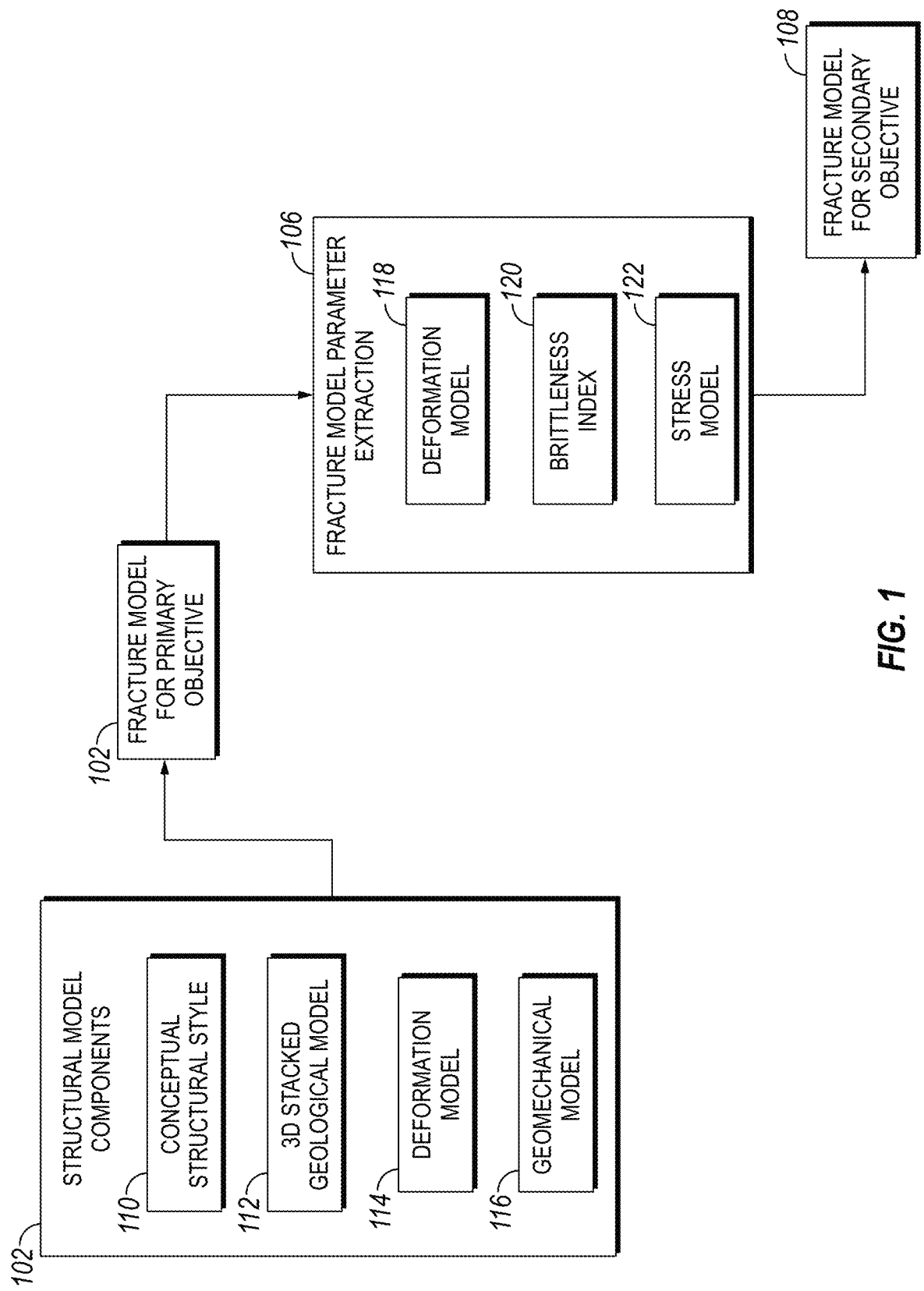
FIG. 1 is a block diagram of a process for constructing a natural fracture model for a secondary reservoir using a stacked 3D geological model in accordance with an embodiment of the disclosure.

FIG. 1 depicts a process 100 for constructing a natural fracture model for a secondary reservoir using a stacked 3D geological model in accordance with an embodiment of the disclosure. As used herein the term "primary objective" refers to a primary reservoir, and the term "secondary objective" refers to a secondary reservoir.

As shown in FIG. 1, the process includes constructing structural model components (block 102), determining a fracture model for the primary objective (block 104), performing a fracture model parameter extraction (block 106), and determining a fracture model for a secondary objective (block 108).

Constructing the structural model components includes quantifying parameters in order to build a 3D fracture model. This process may include extending from the well-scale fracture characterization, and determining a 1D and 3D mechanical earth model, brittleness index, in situ stress model and 3D deformation model.

In some embodiments, the determination of a 3D fracture model may be performed according to the techniques described in U.S. Pat. No. 10,607,043 filed Sep. 14, 2017, and titled "SUBSURFACE RESERVOIR MODEL WITH 3D NATURAL FRACTURES PREDICTION," a copy of which is incorporated by reference in its entirety. In such embodiments, the determination of a 3D fracture model may include the process illustrated in FIGS. 2A-2B and discussed supra.

Figure 2A:
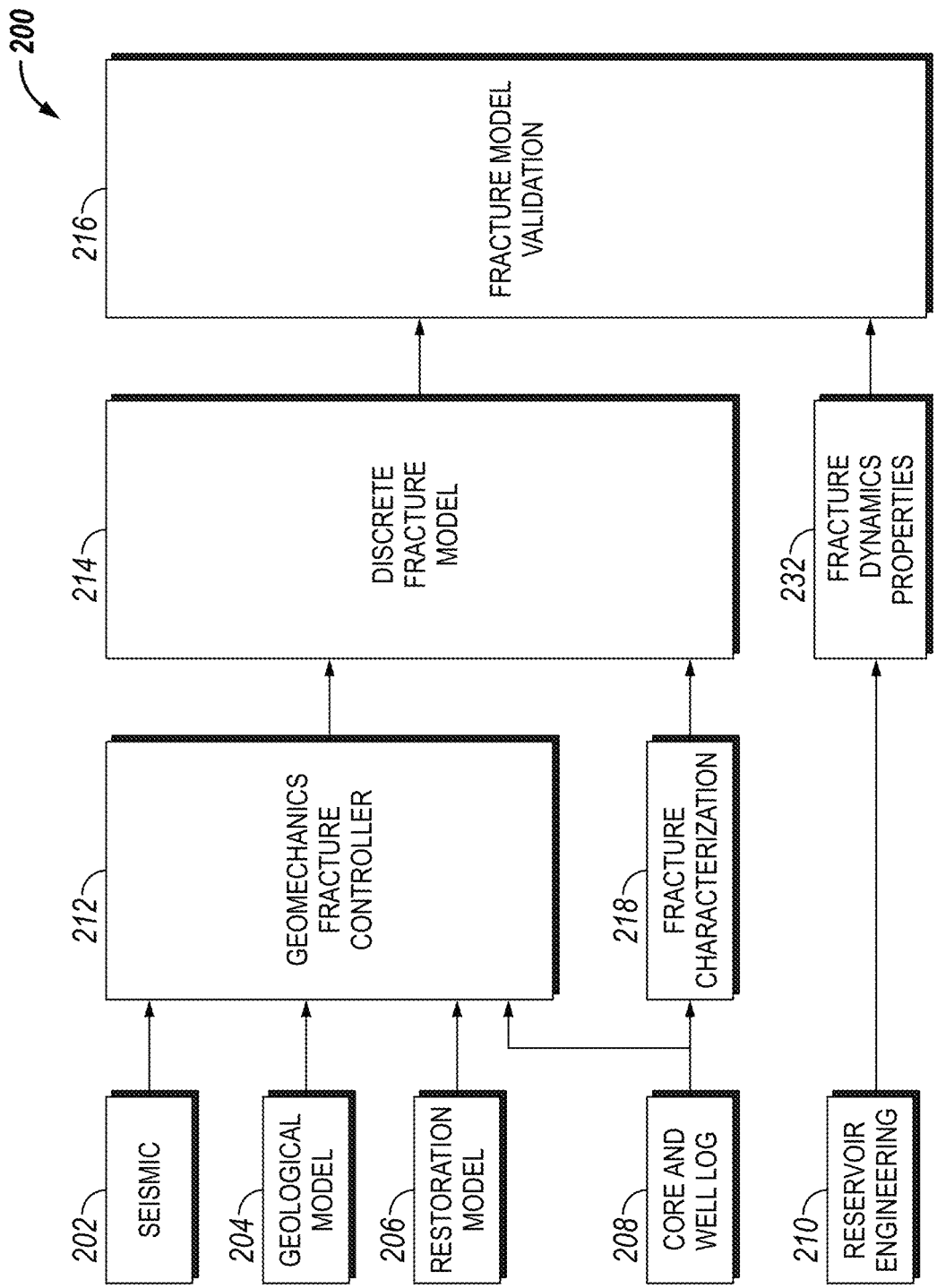
FIGS. 2A and 2B are flowcharts of a process for determining a discrete natural fracture distribution of a 3D fracture model in accordance with an embodiment of the disclosure.
Figure 2B:
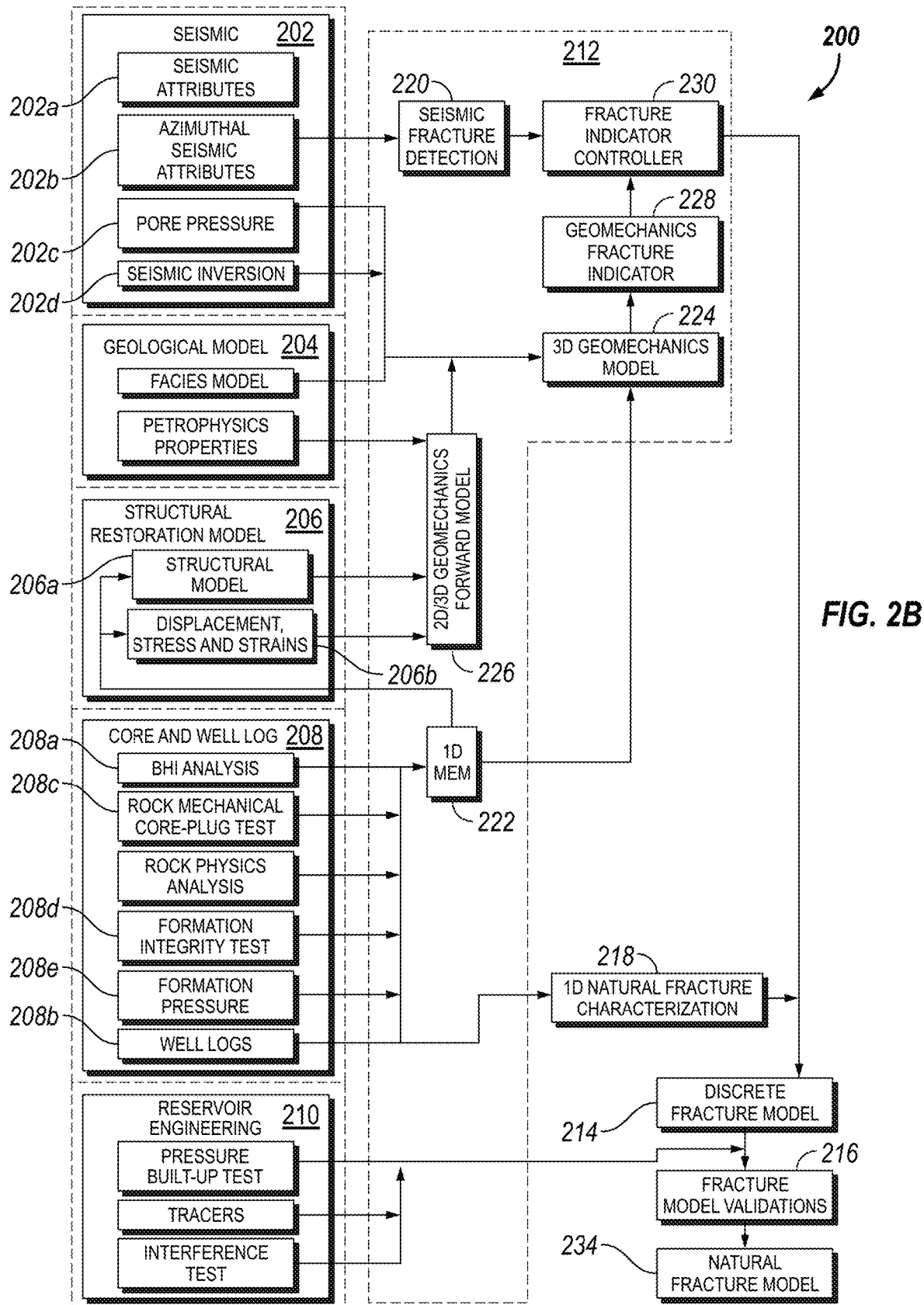

FIGS. 2A and 2B depicts a process 200 for determining a natural fracture distribution of a 3D fracture model in accordance with an embodiment of the disclosure. The inputs to the process 200 may include different reservoir parameters and properties obtained via different techniques and known earth science. As shown in FIGS. 2A and 2B, such inputs may include seismic attributes from seismic surveys (202); rock and mechanical properties from geological modeling (204); measures from structural restoration models (206); core and well logs (208) obtained from formation core samples and well logs performed in wellbores drilling into a reservoir; and reservoir engineering measures obtained (210) from production measures and reservoir simulations of a reservoir layer.

The process 200 may include a geomechanics fracture controller (212), determining a discrete fracture model (214), and validating the fracture model (216). The geomechanics fracture controller (212) may integrate the paleo-stress from structural restoration model (206) obtained for several stages in geological time, and current stress regime conditions obtained through a geomechanical numerical simulation model. In some embodiments, geomechanics fracture controller (212) may apply seismic volume interpretation techniques and attributes to detect possible faults and natural fractures alignments by using post stack discontinuities attributes, azimuthal analysis, and elastic seismic inversion.

The determination of the natural fracture model (214) may include quantifying fracture density in the subsurface reservoir layer using the output from the geomechanics fracture controller (212), and a 1D fracture characterization (218) provided from core samples and borehole well log images from a borehole image (BHI) analysis process 208a (shown in FIG. 2B). The determination of the natural fracture model (214) also includes the determination of fracture dimensions and their properties into the discrete fracture model, described in the disclosure. Examples of the fracture properties resulting from the determination of the natural fracture model (214) include fracture position, orientation, geometry, porosity, aperture, permeability, and the like. In other embodiments, other fracture properties may also be estimated during the determination of the natural fracture model (214).

The validation of the fracture model (216) may include cross-checking or validating the model using reservoir production data. In some embodiments, the natural fracture model may be upscaled to conform to a fine-scale cell grid of geological model and reproduce the natural fracture distribution and their properties, for comparison with the reservoir production data for validation proposes. Several types of reservoir production data can be used to calibrate the fracture models with reservoir engineering data. Examples of such reservoir production data are results of measures obtained from: PTA (Pressure Transient Analysis), tracers, drilling operation events, PLT (production logs), and the like. In other embodiments, other reservoir production data can also be used for cross-checking during the validation of the fracture model (216).

FIG. 2B depicts aspects of the geomechanics fracture controller (212) in further detail in accordance with an embodiment of the disclosure. As shown in FIG. 2B, a seismic fracture detection process (220) is provided with seismic attributes (202a) obtained from seismic volume results (202). The seismic attributes (202a) may include attributes related to natural fractures detections or dislocation detections. Examples of such attributes obtained from the seismic dislocations attribute analysis results may include: variance, anti-tracking, flatness, curvature, and the like. In other embodiments, other seismic attributes may also be provided. As will be appreciated, seismic fracture attributes may be unable to be compared straight forward at wellbore scale due to resolutions issues. However, seismic attributes may be used as a seismic fracture controller or conduct for minor fractures detected at wellbore scale if the relations regarding to the locations and intensity between them exist.

As shown in FIG. 2B, advance seismic fracture detection may also be performed during the seismic fracture detection process (220) using azimuthal seismic analysis (202b) to capture the variations of the wave propagation at different directions. Such variations in wave propagation form anisotropic volumes in the reservoir layer and are helpful in detecting fractures. This azimuthal analysis may be based on whether the anisotropy response in the reservoir is due to natural fractures or caused by another reason. In order to identify whether the anisotropy response may be azimuthal shear anisotropy, sonic acoustic acquisition may be performed at a well location in the naturally fractured reservoir. An example of azimuthal seismic analysis is described in: Gray, F. D. and Head, K. J., 2000, Fracture Detection in the Manderson Field: A 3D AVAZ Case History: The Leading Edge, Vol. 19, No. 11, 1214-1221; and Khalid Al-Hawas, Mohammed Ameen, Mohammad Wahab, and Ed Nebrija, Saudi Aramco, Dhahran, Saudi Arabia Colin Macbeth, Heriot-Watt University, Edinburgh, U. K., 2003, "Delineation of Fracture Anisotropy Signatures in Wudayhi Field by azimuthal seismic data", the Leading Edge.

The geomechanics fracture controller (212) may include a determination of a 1D mechanical earth model (MEM) (222) to determine the rock mechanical properties and stress regime conditions in the reservoir layer. The determination of the 1D MEM may include computing the elastic rock mechanical properties deriving from well logs (208b) and rock mechanical test (208c); using additional information such as reservoir formation pressures (208e) and a Formation Integrity Test (FIT))208d), the in situ stress regime can be predicted and mechanical stratigraphy (Geomechanical Facies) computed. The mechanical stratigraphy may conform the rock mechanical response to the geological deformation process and may be used as constraints for natural fractures presence, constraining their development to some particular layer through brittleness concepts, depending also on the deformation magnitude. Additionally, the maximum horizontal stress direction may be detected by the Borehole Image Analysis (BHI) (208a), and the in situ stress magnitude derived from the 1D MEM may be used to predict the stress regime of a 3D geomechanical model (224) (also referred to as a "3D mechanical earth model (MEM)").

As shown in FIG. 2B, the geomechanics fracture controller (212) may include the determination of 2D/3D geomechanics forward model (226) that combines a structural model (208a) and displacement, paleo-stress, and strain measures 208b from the structural restoration model (208) with petrophysical properties (204b) from geological model (204). The results take the form of structural restoration as horizons displacement and deformation using boundary conditions. The determination of 2D/3D geomechanics forward model (226) may include as a Finite Element Method (FEM) using geomechanics numerical simulation software, to estimate the tensor stress regime corresponding to the deformation estimate from structural restoration at the in situ stress conditions.

Figure 3:
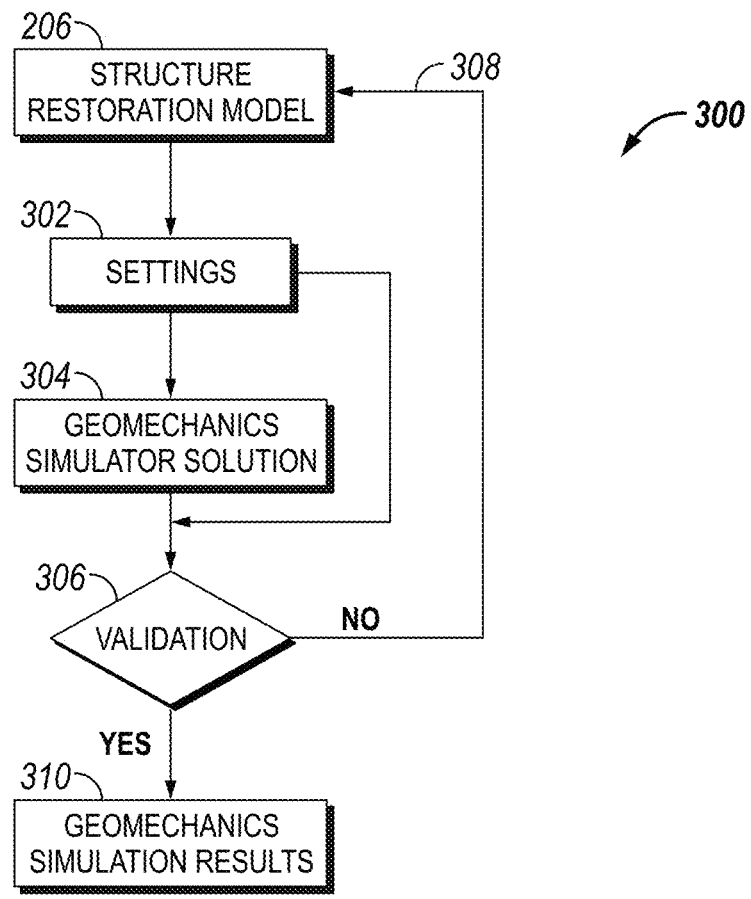
FIG. 3 is a flowchart of a process for the determination of a 2D/3D geomechanics forward model in accordance with an embodiment of the disclosure.

FIG. 3 depicts a process 300 of the determination of 2D/3D geomechanics forward model (226) in accordance with an embodiment of the disclosure. The initial parameter and strain boundary conditions may be defined for the numerical simulation and processing may be iteratively repeated until an equilibrium stress is obtained according to present to in situ stress conditions in the reservoir. As will be appreciated, a number of geomechanics simulator methodologies are commercially available and are able to estimate stress conditions using the deformation model from the structural restoration model. These results can be used to calculated or predict the possible origin for the natural fractures as stretching zones, compression zones which is an input to classify the different kind of natural fractures and their possible orientations from a qualitative perspective, using a strain tensor derivate from the 2D/3D geomechanics forward model (226). Example geomechanics simulator methodologies include ABAQUS™ from Dassault Systemes; VISAGE™ from Schlumberger; and ELFEN™ from Rockfield, COMSOL™ from AltaSim Technologies.

Figure 6:
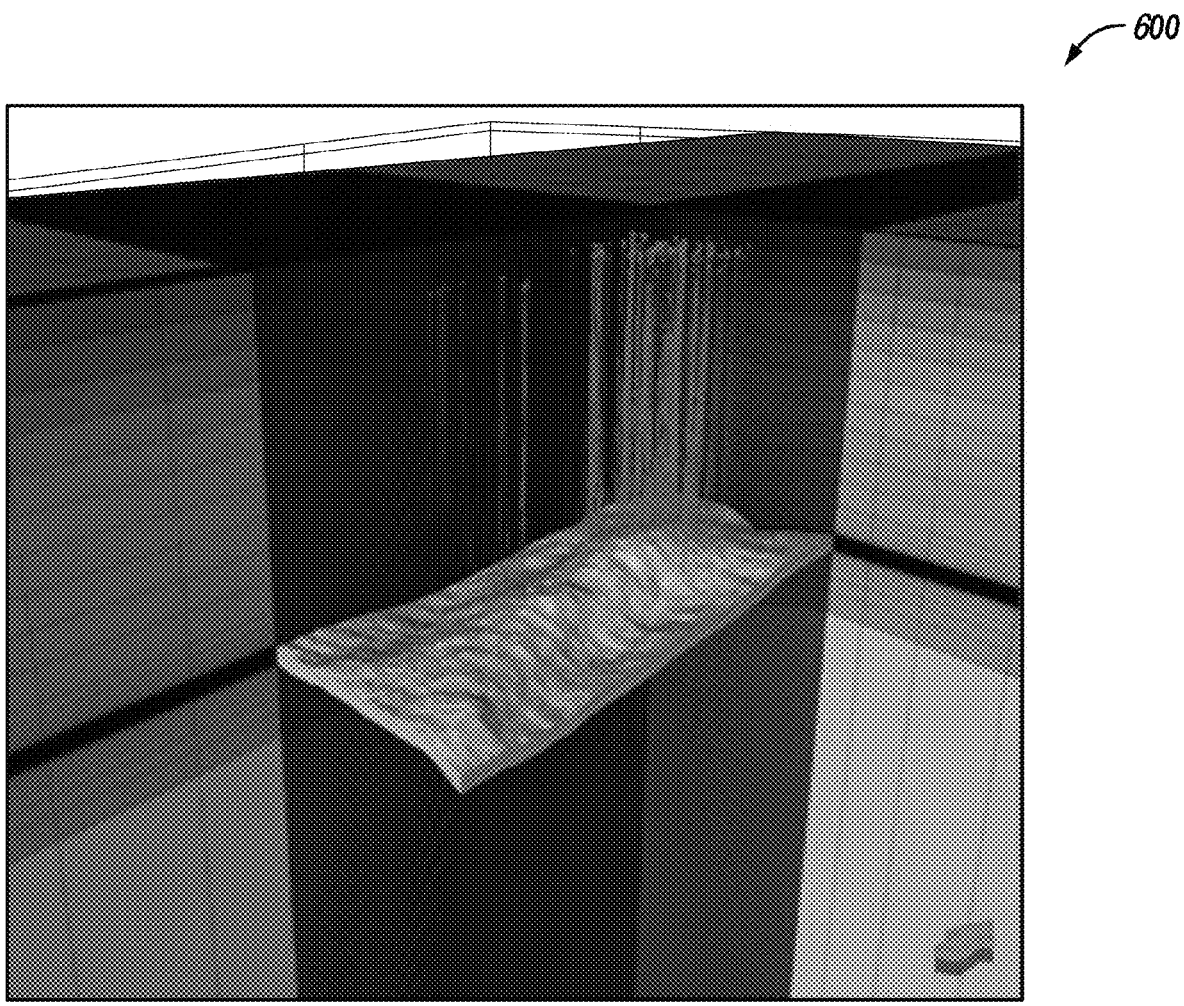
FIG. 6 depicts the gridding of a geomechanical earth model in accordance with an embodiment of the disclosure.

As shown in FIG. 3, input measures from the structural restoration modeling (206) are received for the 2D/3D geomechanics forward model (226) and stored as initial settings (302). The settings (302) are then processed by a geomechanics simulator (304) of the type described supra. The output from the geomechanics simulator is then cross-checked or validated (306) against specified stress equilibrium conditions. As shown in FIG. 6, if confirmation results are not achieved during the current iteration (line 308), the previous settings of the step are adjusted for iteration by simulation step. The iterations may be repeated until specified conditions are validated. After validation, the simulation results (310) may be provided as the 2D/3D geomechanics forward model (226) and may indicate conditions of stress, strain and pre-existing faults and fractures in the reservoir layer.

The 3D geomechanics model (224) of the geomechanics fracture controller (212) may include the measures and indications of rock mechanical properties distribution. The 3D geomechanics model (224) may further include elastic rock properties and rock strength throughout the 3D geological grid. The 3D geomechanics model (224) may be calculated by boundary conditions to simulate the in situ stress regime. As discussed in the disclosure, the in situ stress regime is a condition where the stress field is unperturbed or is in equilibrium without any production or influences of perforated wells.

The determination of the 3D geomechanics model (224) may use elastic seismic inversion (202d) in the form of acoustic impedance, bulk density, and may also include pore pressure (202c) covering the 3D geological model area. The seismic inversion parameters may be obtained from an elastic seismic inversion (202d) and seismic velocity analysis for the pore pressure (202c). The determination of the 3D geomechanics model (224) may also be based on rock mechanical correlations between dynamics and static elastic rock mechanical properties which have been determined as a result of the 1D mechanical earth model (MEM) (222). 3D mechanical stratigraphy may also be calculated using the elastic properties of the 3D geomechanics model (224), and may be used to constrain the fracture distribution using brittleness property definition. An example processing methodology for determining the 3D geomechanics model (224) is described in: Herwanger, J. and Koutsabeloulis, N. C.: "Seismic Geomechanics—How to Build and Calibrate Geomechanical Models using 3D and 4D Seismic Data", 1 Edn., EAGE Publications b.v., Houten, 181 pp., 2011.

Additionally, geomechanics forward modeling of the type described infra and shown in FIG. 3 may be used as a loop process between the 2D/3D geomechanics forward model (226) and 3D geomechanics model (224). Such a loop process may capture the displacement and deformation quantified in the structural restoration model (206), and may provide more accurate calculations of the strain distribution corresponding to the structural evolution faulting and folding in the model (206).

The determination of the 3D geomechanics model (226) may include a geomechanics fracture indicator (228) that may form indications of fractures based on selected rock mechanical properties distributed for the 3D geomechanics model (224). The mechanical stratigraphy may be defined in the 3D geomechanics model (224) by using the Brittleness concept and may be used as a geomechanics fracture indicator to define the fracture position and density or spacing through the layering. A strain or plastic strain model may be determined in the 2D/3D geomechanics forward model (226) and 3D geomechanics model (224) and may be used as indicator of fracture orientation (dip and azimuth) and possible areal/volumetric density distribution, according to the kind of geological structural environment. Several components of fractures can be considered as geomechanics indicator for fractures, such as fractures relate to folding and fractures related to faulting. The quantifications about the strain may be qualitative in terms of real fracture density present in the reservoir.

As shown in FIG. 2B, the determination of the 3D geomechanics model (224) may include a fracture indicator controller (230). The fracture indicator controller (230) may compare attributes determined from seismic fracture detection (220) and geomechanics fracture indicator (228) in terms of fracture position, fracture density and orientation in a qualitative way, to evaluate possible coincidence zones, between the models, where natural fractures can be expected to be created. In some cases, the attributes determined from seismic fracture detection (220) and geomechanics fracture indicator (228) may be complementary due to the different vertical and areal resolution in which both of them are calculated.

The discrete fracture model (214) may be determined subsequent to identification of natural fracture locations by the fracture indicator controller (230). The discrete fracture model may build a representative natural fracture model based on stochastic mathematical simulations. As shown in FIG. 2B, the discrete fracture model (214) may be constructed from the fracture indicator controller (230) and the intensity and orientation from the 1D natural fracture characterization (218).

The determination of the discrete fracture model (214) may receive as input the results of the 1D natural fracture characterization (218), which may be obtained from the borehole image resistivity analysis or acoustic image interpretation (208a) of the core and well logs (208) and may represent the intensity fracture, aperture, fracture classification and fracture orientation along a wellbore.

As noted infra, the discrete fracture model (214) may be determined using the fracture indicator controller (230) and the 1D natural fracture characterization (218). The determination may constrain the orientation and fracture intensity in a qualitative way, and using the 1D natural fracture characterization (218), may calculate the real fracture intensity quantification. This output can be used to predict a natural fracture model through the discrete fracture network methodology. For fracture intensity quantification purposes the fracture intensity derived from the fracture indicator controller (230) may be normalized for comparison with the BHI fracture intensity derived from the 1D natural fracture characterization (218).

The fracture model validation 216 may validate the discrete fracture model (214). The validation may be performed using reservoir production data. As shown in FIG. 2B, Several types of data may be used as fracture dynamic properties (232) to calibrate the fracture model with reservoir engineering measures (210). For example, results from a PTA (Pressure Transient Analysis) test, or measures from tracers, drilling operations, production logs, and the like may be used. For example, pressure transient analysis can estimate permeability contribution due to fracture presence and the capacity for fluid flow due to the fractures' presence. In another example, tracer injection, production logs, interference test and possibly some drilling events as can indicate mud loss circulation that can provide evidence of the presence of natural fractures. The discrete fracture model (214) may upscale into the fine-scale cell grid geological model, and reproduce the natural fracture distribution and their properties to compare with the validation data.

After the fracture model validation, a discrete natural fracture model (234) may be produced as a result of the process 200. As previously described, the discrete natural fracture model (234) may indicate the presence and extent of natural fractures in the subsurface geological structures.

As shown in FIG. 1, constructing the structural model components (block 102) may also include determining a conceptual structural style (block 110). Determining a conceptual structural style may include identifying the paleo-stress regime that originated the natural fractures. As will be appreciated, tectonic paleo-stresses and strains may control the structural geometry and growth history; in some instances, the structural style may be defined based on regional to semi-regional studies.

Figure 4:
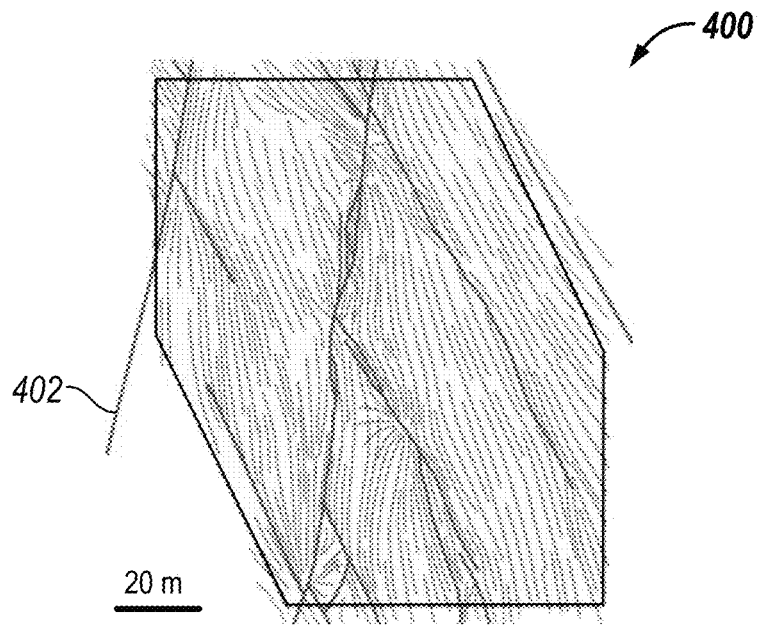
FIG. 4 is a schematic diagram of complex fracture strikes in a strike-slip system in accordance with an embodiment of the disclosure.

Normal and reverse stress faulting systems may typically be characterized by damage zone areas where natural fractures are mostly developed around the fault and decrease in intensity away from the fault. However, natural fracture distribution is more complex in strike-slip transpressional or transtensional systems. By way of example, FIG. 4 depicts complex fracture strikes 402 in a strike-slip system 400 in accordance with an embodiment of the disclosure. As discussed supra and illustrated in FIGS. 2A and 2B, the paleo-stress from the structural model may be integrated into the development of subsequent models.

Figure 5B:
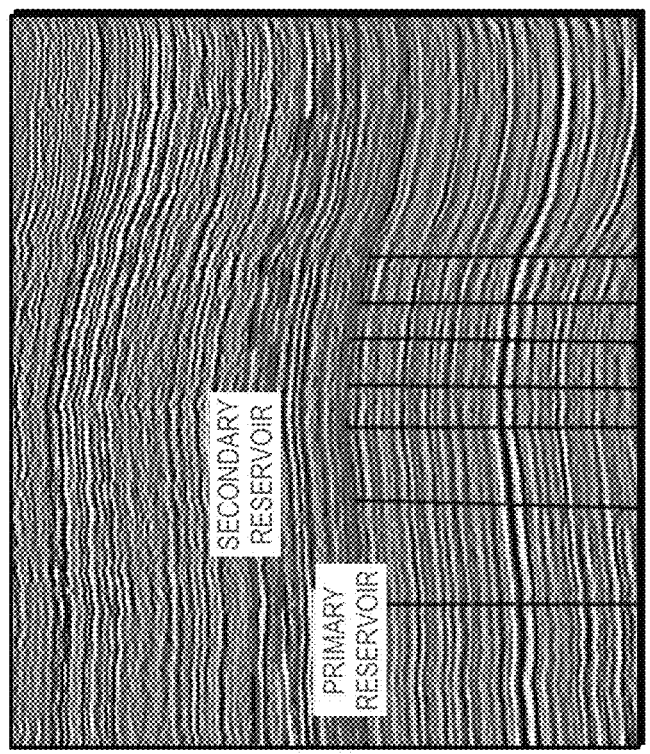
FIG. 5B depicts a seismic image illustrating a structural framework extending from a primary objective to a secondary objective in accordance with an embodiment of the disclosure.
Figure 5A:
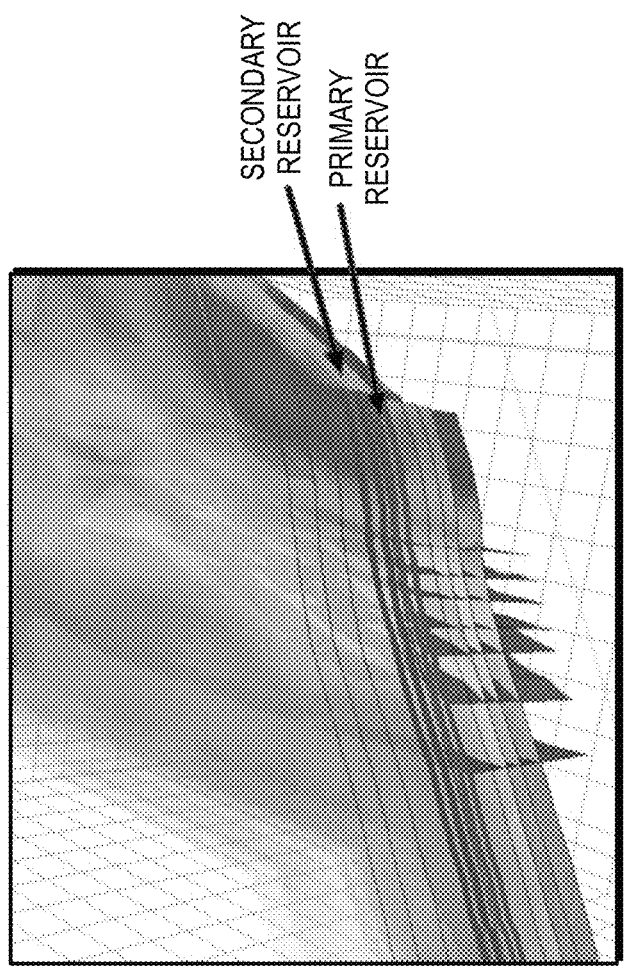
FIG. 5A depicts a Volume-Base-Model (VBM) illustrating a structural framework extending from a primary objective to a secondary objective in accordance with an embodiment of the disclosure.

Constructing the structural model components (block 102) may also include determining a 3D stacked geological model (block 112). The use of a 3D stacked geological model facilitates the modeling of the mechanical drivers for different reservoirs where a larger and more complete dataset exists for the primary reservoir and natural fractures may be consistently modeled. The 3D stacked geological model and structural framework may be defined by surfaces and faults obtained from seismic interpretation and formation well tops. A Volume-Base-Model (VBM) may be built using surface extrapolation based on the cross-correlation between well tops, such that the VBM considers fault features such as throw, extension, and geometry. For example, FIG. 5A depicts a VBM 500 and FIG. 5B depicts a seismic image 504 that depict a structural framework extending from a primary objective (shown in red) to a secondary objective (shown in blue). By way of example, the 3D stacked geological model may be used as the geological model for the various determinations illustrated in FIGS. 2A and 2B and described supra.

Additionally, constructing the structural model components (block 102) may include determining a deformation model (block 114) Determining the deformation model may include performing a geomechanics numerical simulation using finite element techniques to capture the main episodes of paleo-stress tectonic deformation that could create most of the fracture observed at well level. These fractures may be modeled according to two main structural processes: 1) folding and 2) faulting.

As shown in FIG. 1, after the faults are modeled into the structural framework (by determining the deformation model), a geomechanical earth model may be determined (block 116). In some embodiments, the geomechanical earth model may be constructed using geomechanical simulation software such as VISAGE™ manufactured by Schlumberger Limited of Houston, Texas, USA. By way of example, FIG. 6 depicts the gridding of a geomechanical earth model 600 in accordance with an embodiment of the disclosure. The modeling may include defining the compliance between the normal and shear stiffness mechanical properties as discontinuity properties in order to reproduce or capture the observed data from in-situ stress indicator steps. The present-day in-situ stress regime may be defined calculating the three principal stress magnitudes. Principal stresses (that is, maximum horizontal stress $\sigma_{Hmax}$, minimum horizontal stress $\sigma_{hmin}$ and vertical stress $\sigma_V$) may be calculated from elastic properties, rock strength, and pore pressure using a poro-elasticity stress model according to the techniques described in U.S. patent application Ser. No. 16/792,742 filed Feb. 17, 2020, and titled "DETERMINATION OF CALIBRATED MINIMUM HORIZONTAL STRESS MAGNITUDE USING FRACTURE CLOSURE PRESSURE AND MULTIPLE MECHANICAL EARTH MODEL REALIZATIONS," now issued U.S. Pat. No. 11,098,582, a copy of which is incorporated by reference in its entirety. As described therein, various parameters distributed into a 3D geocellular grid model, such as acoustic sonic wave data, bulk density, elastic properties, rock strength properties, fluid pore pressure and stress boundary conditions, may be used to model an "in-situ" stress regime magnitude to produce a reliable mechanical earth model by using the poro-elasticity stress model. Additionally, the in-situ stress conditions may be modeled to capture all the features for the mechanical properties such as brittleness model, geomechanical facies, in-situ stress rotations and stress magnitude variation along of the field. These techniques may be incorporated into the determination of the 3D geomechanical model illustrated in FIGS. 2A and 2B and described supra.

Figure 7A:
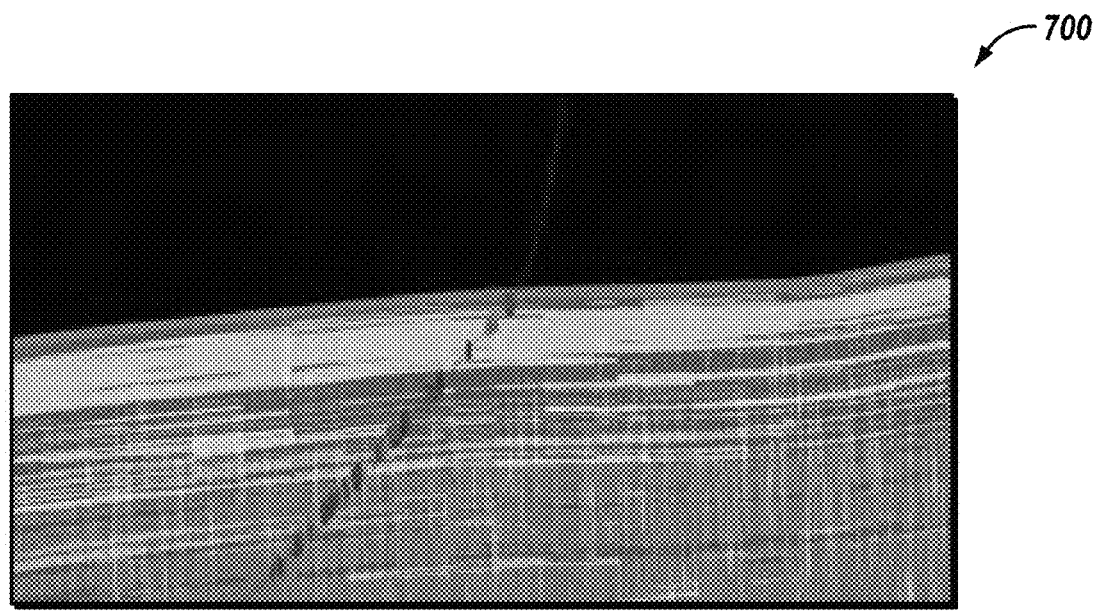
FIG. 7A depicts a natural fracture distribution across a primary objective by the combination of a brittleness and deformation model in accordance with an embodiment of the disclosure.
Figure 7B:
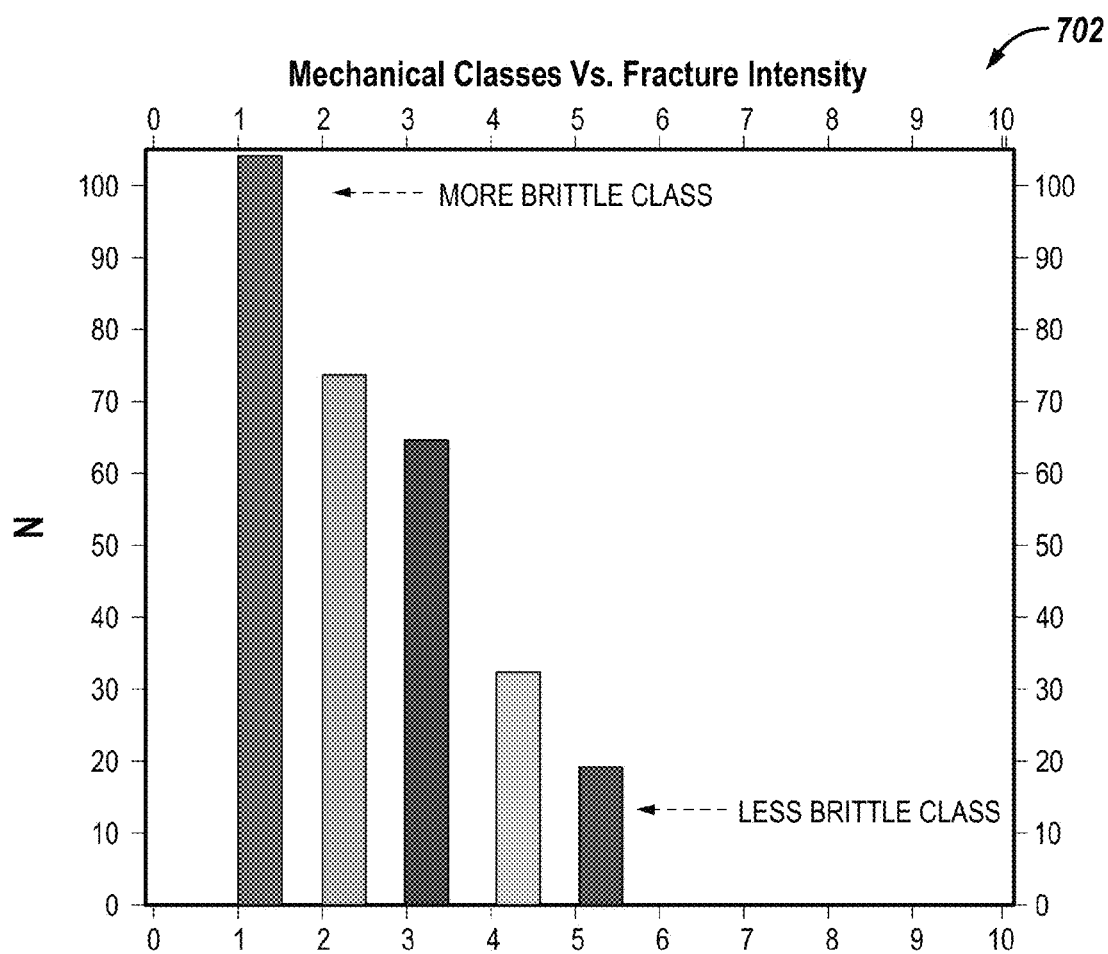
FIG. 7B is a corresponding bar graph legend for the natural fracture distribution of FIG. 7A that describes the brittle classes depicted in the distribution in accordance with an embodiment of the disclosure.

Next, the fracture model for the primary objective may be constructed (block 104). As discussed supra, in some embodiments the fracture model may be determined according to the process depicted in FIGS. 2A, 2B and 3. The construction of the fracture model of the primary objective may include tectonics and geomechanics drivers that control the fracture distribution and orientation. Once completed, the same drivers may be recomputed for the secondary objective provided that they are included in the stacked grid. By way of example, FIG. 7A depicts a natural fracture distribution 700 across a primary objective by the combination of a brittleness and deformation model in accordance with an embodiment of the disclosure. FIG. 7B is a corresponding bar graph legend 702 for the natural fracture distribution 700 that describes the brittle classes depicted in the distribution in accordance with an embodiment of the disclosure. The distribution per brittleness index for the natural fractures, as shown in FIGS. 7A and 7B, is one of the relevant drivers for fracture distribution.

As shown in FIG. 1, after constructing the fracture model for the primary objective, parameters may be extracted from the fracture model (block 106). In some embodiments, the extracted parameters may include the deformation model (block 118), the stress distribution (block 120), and the stress modeling (block 122).

Figure 8A:
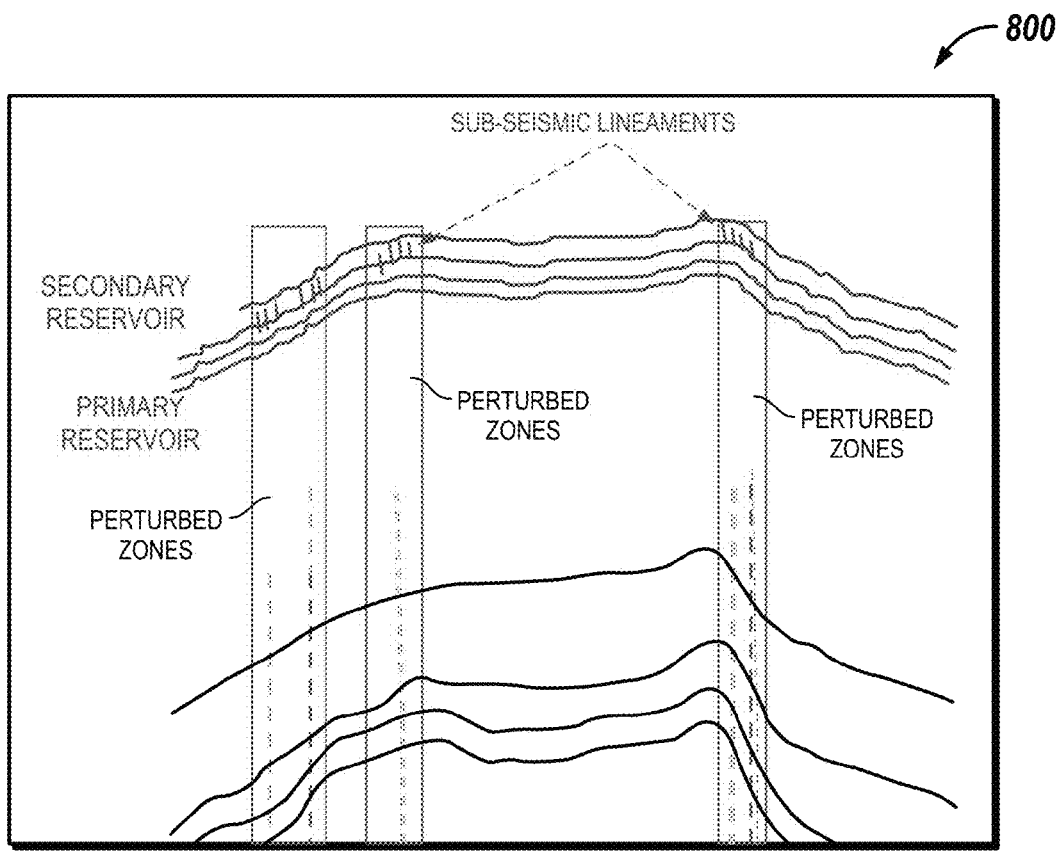
FIG. 8A depicts a cross-section showing the distribution of a paleo-deformation model affecting a primary and secondary objective in accordance with an embodiment of the disclosure.
Figure 8B:
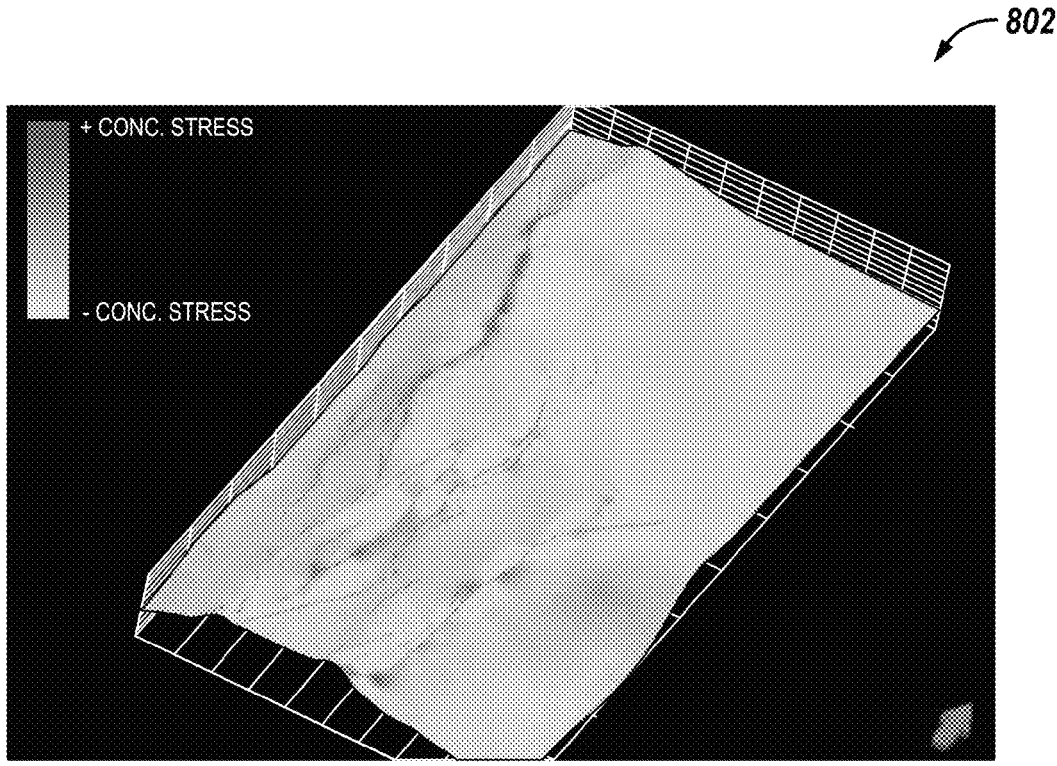
FIG. 8B depicts a paleo-deformation model illustrating the stress concentration distribution in accordance with an embodiment of the disclosure.

The extraction may include the deformation model (118) that, as discussed herein, may be determined at the 3D modeling stage using geomechanics numerical simulation performing using finite element methods to capture the paleo-stress tectonic deformation that may create most of the fractures observed at well level. As also noted herein, folding and faulting are the two main structural processes considered in the development of natural fractures. The geomechanical restoration process may determine stresses and strains associated with paleotectonic events that control the structural evolution of the reservoir and related fracture occurrence. The outcome deformation modeling process may indicate both fold-related and fault-related fractures. In such instances, a corresponding simulation technique, either structural restoration or paleo-stress inversion, may be applied in order to obtain strain/stress deformation for each fracture origin mechanism. By way of example, FIGS. 8A and 8B depicts the distribution of a paleo-deformation model affecting both reservoirs at the same time, creating similar deformation for both layers, primary and secondary objectives. The deformation modeling corresponds to a strike slip reactivation process where the faults are subvertical and vertical displacement is minimum or absent. FIG. 8A depicts a cross-section 800 illustrating the effect of deep faults controlling growth and fracture distribution on shallower and younger formations in accordance with an embodiment of the disclosure. As shown in FIG. 8A, the primary reservoir with abundant data and secondary with restricted data are both affected by the same deformation event. FIG. 8B depicts the paleo-deformation model 802 illustrating the stress concentration distribution in accordance with an embodiment of the disclosure.

Figure 9A:
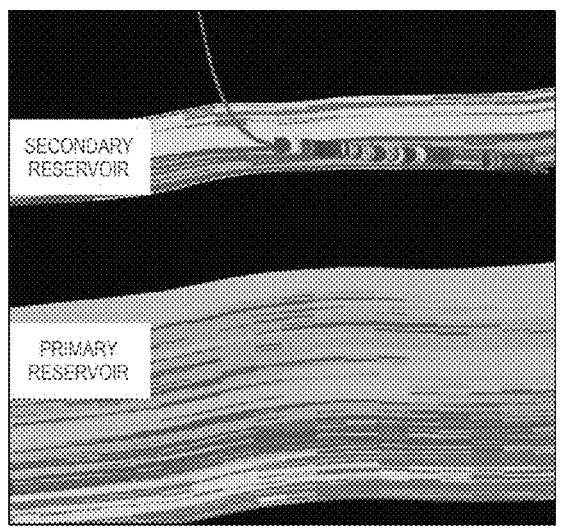
FIG. 9A is a map of a brittleness index showing a different distribution between the primary and secondary objectives in accordance with an embodiment of the disclosure.
Figure 9B:
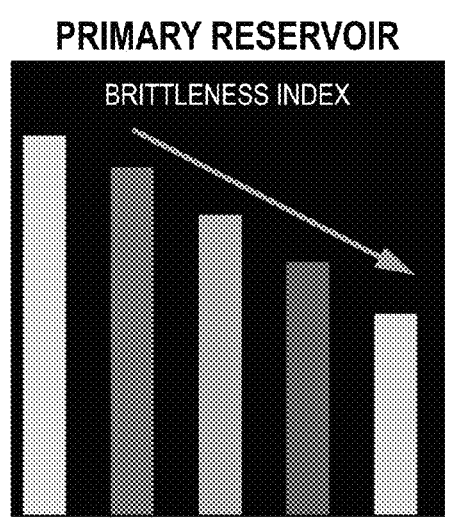
FIG. 9B depicts a bar chart legend describing the magnitude of the brittleness index for FIG. 9A in accordance with an embodiment of the disclosure.

The extracted parameters may also include a brittleness index (block 120). Modeling rock brittleness may be used to constrain which zones within the reservoir will break without significant plastic deformation when subjected to stress. Brittle materials absorb relatively little energy prior to fracture, even those of high strength. In a complex heterogeneous fracture rock mass, the brittleness property can be modeled using neuronal network classification taking as inputs the elastic properties and stress regime to generate mechanical facies. The mechanical facies should have some proportional relation with the distribution of natural fractures. This relationship can be evaluated using histogram filtered by fracture density, where most brittle cell values in the model should correspond with the highest fracture densities. Moreover, mechanical properties between primary and secondary reservoirs may be different, therefore brittleness property will also vary. Establishing the relationship between fracture intensity vs brittleness in the primary reservoir, which contains abundant data sampling, may be used to define the same relationship for the secondary reservoir. For example, FIG. 9A is a map 900 of the brittleness index showing a different distribution between the primary and secondary objectives in accordance with an embodiment of the disclosure. FIG. 9B depicts a bar chart legend 902 describing the magnitude of the brittleness index for FIG. 9A in accordance with an embodiment of the disclosure.

Additionally, the extraction of parameters from the primary target fracture objective may include stress modeling (block 122). In some embodiments, the in-situ stress regime may be modeled using FEM (Finite Element Model) techniques, which can predict the stress/strain tensor regime using mechanical boundary elements. FEM methods use geomechanics simulations to converge a proper solution under certain boundary stress conditions. Maximum principal horizontal stress model and magnitude may be obtained from this methodology for each cell into the 3D grid geocellular model, such as described in Herwanger, J. and Koutsabeloulis, N. C.: "Seismic Geomechanics—How to Build and Calibrate Geomechanical Models using 3D and 4D Seismic Data", 1 Edn., EAGE Publications b.v., Houten, 181 pp., 2011. In some embodiments, the stress regime may be modeled using geomechanical simulation software such as VISAGE™ manufactured by Schlumberger Limited of Houston, Texas, USA, or Abaqus manufactured by Dassault Systemes SE of Vèlizy-Villacoublay, France.

Figure 10A:
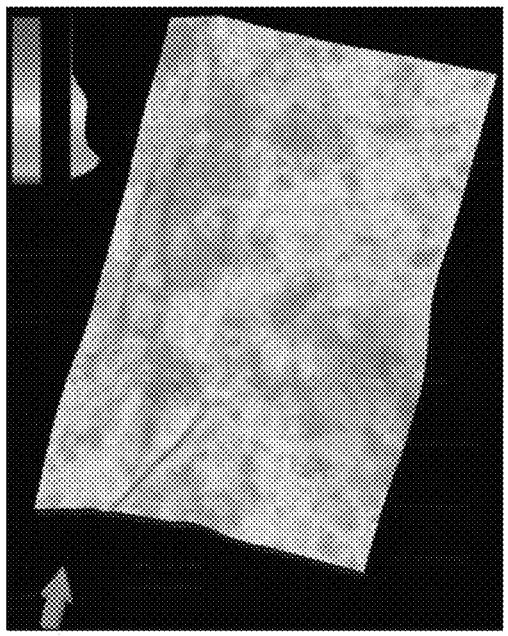
FIG. 10A is a map of minimum horizontal stress magnitude for a primary objective in accordance with an embodiment of the disclosure.
Figure 10B:
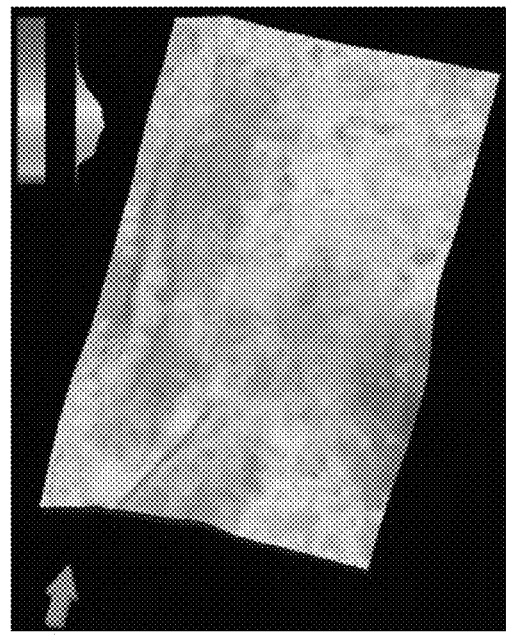
FIG. 10B is a map of minimum horizontal stress magnitude for a secondary objective in accordance with an embodiment of the disclosure.

The in-situ stress distribution between primary and secondary reservoirs may be calculated using the 3D stacked model as input for geomechanical numerical simulation. As shown in FIGS. 10A and 10B, the distribution and magnitude of stress between the two reservoirs are slightly different, which corresponds to the mechanical heterogeneity presented in the field. FIG. 10A depicts a minimum horizontal stress magnitude map 1000 for a primary reservoir, and FIG. 10B depicts a minimum horizontal stress magnitude map 1002 for a secondary reservoir in accordance with an embodiment of the disclosure. The histograms in FIGS. 10A and 10B fracture density distribution according with the observed amount of natural fractures per index.

Figure 11:
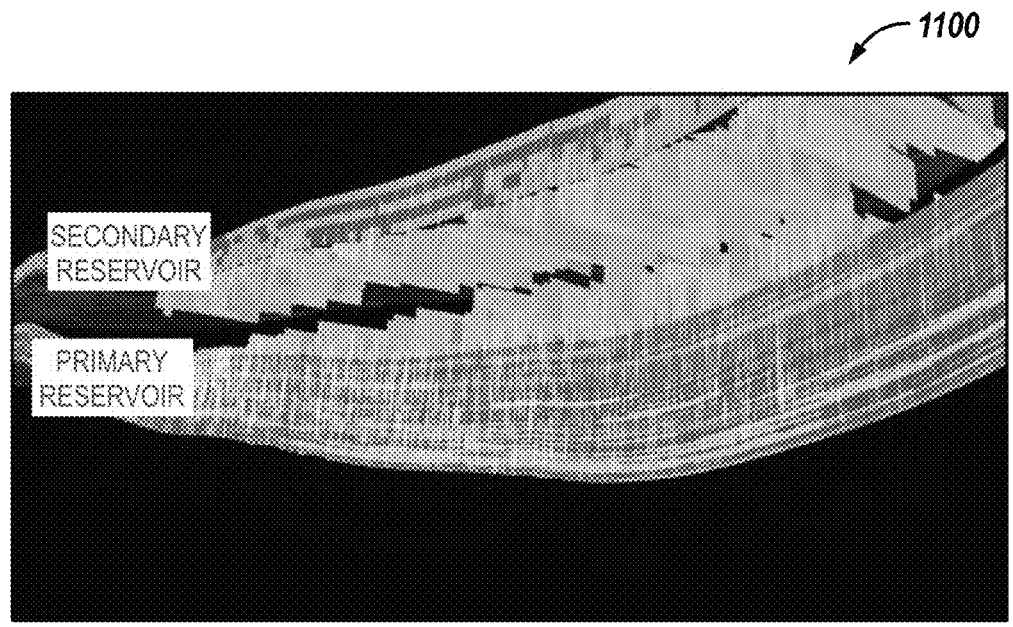
FIG. 11 is a 3D map illustrating the distribution of natural fractures for a primary objective and secondary objective.

Using the extracted parameters from the primary objective fracture model, the fracture model for the secondary objective may be constructed (block 108). The 3D deformation, stress magnitude, and brittleness index may be used ss inputs. By way of example, FIG. 11 shows a 3D map 1100 illustrating the distribution of natural fractures for the primary reservoir and secondary reservoir.

The process 100 may include identifying a location in the secondary objective for a well using fracture model for the secondary objective. For example, a location for a well may be determined based on the presence or absence of natural fractures indicated by fracture model for the secondary objective. The process 100 may thus further include drilling a well in a subsurface geological structure at the determined location or controlling the drilling of the well in a subsurface geological structure at the determined location. In some embodiments, the process 100 may include performing a hydraulic fracturing stimulation operation in the drilled well or controlling the hydraulic fracturing stimulation operation.

Figure 12:
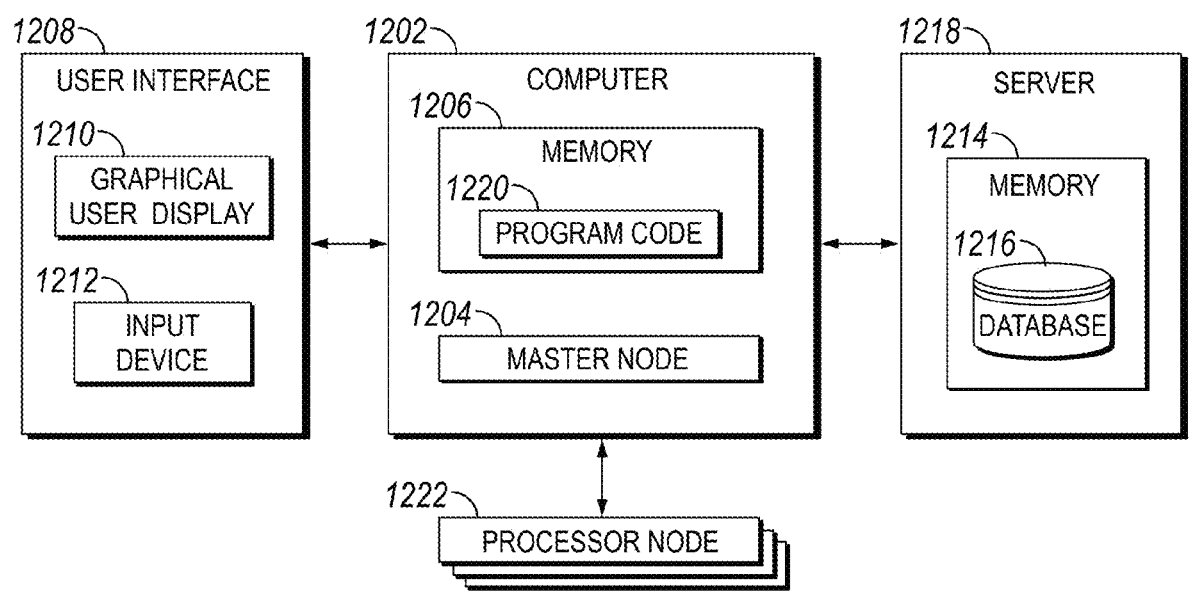
FIG. 12 is a block diagram of a data processing system in accordance with an embodiment of the disclosure.

FIG. 12 depicts a data processing system 1200 that includes a computer 1202 having a master node processor 1204 and memory 1206 coupled to the processor 1204 to store operating instructions, control information and database records therein in accordance with an embodiment of the disclosure. The data processing system 1200 may be a multicore processor with nodes such as those from Intel Corporation or Advanced Micro Devices (AMD), or an HPC Linux cluster computer. The data processing system 1200 may also be a mainframe computer of any conventional type of suitable processing capacity such as those available from International Business Machines (IBM) of Armonk, N.Y., or other source. The data processing system 1200 may in cases also be a computer of any conventional type of suitable processing capacity, such as a personal computer, laptop computer, or any other suitable processing apparatus. It should be understood thus that a number of commercially available data processing systems and types of computers may be used for this purpose.

The computer 1202 is accessible to operators or users through user interface 1208 and are available for displaying output data or records of processing results obtained according to the present disclosure with an output graphic user display 1210. The output display 1210 includes components such as a printer and an output display screen capable of providing printed output information or visible displays in the form of graphs, data sheets, graphical images, data plots and the like as output records or images.

The user interface 1208 of computer 1202 also includes a suitable user input device or input/output control unit 1212 to provide a user access to control or access information and database records and operate the computer 1202. Data processing system 1200 further includes a database of data stored in computer memory, which may be internal memory 1206, or an external, networked, or non-networked memory as indicated at 1214 in an associated database 1216 in a server 1218.

The data processing system 1200 includes executable code 1220 stored in non-transitory memory 1206 of the computer 1202. The executable code 1220 according to the present disclosure is in the form of computer operable instructions causing the data processor 1204 to determine structural model components, determine a fracture model for a primary objective (that is, reservoir), extract parameters from the fracture model, and determine a fracture model for a secondary objective. Moreover, the computer operable instructions of the executable code 1220 may identify well locations and control drilling operations based on the fracture model for the secondary objective.

It should be noted that executable code 1220 may be in the form of microcode, programs, routines, or symbolic computer operable languages capable of providing a specific set of ordered operations controlling the functioning of the data processing system 1200 and direct its operation. The instructions of executable code 1220 may be stored in memory 1206 of the data processing system 1200, or on computer diskette, magnetic tape, conventional hard disk drive, electronic read-only memory, optical storage device, or other appropriate data storage device having a non-transitory computer readable storage medium stored thereon. Executable code 1220 may also be contained on a data storage device such as server 1218 as a non-transitory computer readable storage medium, as shown.

The data processing system 1200 may be include a single CPU, or a computer cluster as shown in FIG. 12, including computer memory and other hardware to make it possible to manipulate data and obtain output data from input data. A cluster is a collection of computers, referred to as nodes, connected via a network. A cluster may have one or two head nodes or master nodes 1204 used to synchronize the activities of the other nodes, referred to as processing nodes 1222. The processing nodes 1222 each execute the same computer program and work independently on different segments of the grid which represents the reservoir.

Ranges may be expressed in the disclosure as from about one particular value, to about another particular value, or both. When such a range is expressed, it is to be understood that another embodiment is from the one particular value, to the other particular value, or both, along with all combinations within said range.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described in the disclosure. It is to be understood that the forms shown and described in the disclosure are to be taken as examples of embodiments. Elements and materials may be substituted for those illustrated and described in the disclosure, parts and processes may be reversed or omitted, and certain features may be utilized independently, all as would be apparent to one skilled in the art after having the benefit of this description. Changes may be made in the elements described in the disclosure without departing from the spirit and scope of the disclosure as described in the following claims. Headings used in the disclosure are for organizational purposes only and are not meant to be used to limit the scope of the description.

What is claimed is:

1. A method for developing a naturally fractured reservoir, the method comprising:

obtaining a plurality of reservoir parameters representing a respectively plurality of properties of a primary naturally fractured reservoir;

determining a stacked geological model extending from the primary naturally fractured reservoir to a secondary naturally fractured reservoir;

determining a geomechanical model using the obtained plurality of reservoir parameters and the stacked geological model;

forming a primary natural fracture model by processing the obtained plurality of reservoir parameters and a plurality of petrophysical properties from the geological model to identify the presence and extent of natural fractures at locations in the primary naturally fractured reservoir;

extracting a plurality of parameters from the primary natural fracture model for the primary naturally fractured reservoir; and constructing a secondary fracture model for the secondary naturally fractured reservoir using the extracted plurality of parameters to identify the presence and extent of natural fractures at locations in the secondary naturally fractured reservoir.

2. The method of claim 1, wherein the reservoir parameters comprise seismic attributes from seismic surveys of a subsurface geological structure.

3. The method of claim 1, wherein the reservoir parameters comprise rock and mechanical properties from a geological model of a subsurface geological structure.

4. The method of claim 1, wherein the reservoir parameters comprise a structural model of a subsurface geological structure.

5. The method of claim 1, wherein the reservoir parameters comprise a paleo-stress regime of a subsurface geological structure.

6. The method of claim 1, wherein the plurality of parameters comprise a deformation model, a brittleness index, and a stress model.

7. The method of claim 1, comprising determining a deformation model for use in the geomechanical model.

8. The method of claim 1, comprising:
identifying a location in the secondary naturally fractured reservoir using the second fracture model; and
drilling a well in a subsurface geological structure at the location in the secondary naturally fractured reservoir.

9. A non-transitory computer-readable storage medium having executable code stored thereon for developing a naturally fractured reservoir, the executable code comprising a set of instructions that causes a processor to perform operations comprising:
obtaining a plurality of reservoir parameters representing a respectively plurality of properties of a primary naturally fractured reservoir;
determining a stacked geological model extending from the primary naturally fractured reservoir to a secondary naturally fractured reservoir;
determining a geomechanical model using the obtained plurality of reservoir parameters and the stacked geological model;
forming a primary natural fracture model by processing the obtained plurality of reservoir parameters and a plurality of petrophysical properties from the geological model to identify the presence and extent of natural fractures at locations in the primary naturally fractured reservoir;
extracting a plurality of parameters from the primary natural fracture model for the primary naturally fractured reservoir; and
constructing a secondary fracture model for the secondary naturally fractured reservoir using the extracted plurality of parameters to identify the presence and extent of natural fractures at locations in the secondary naturally fractured reservoir.

10. The non-transitory computer-readable storage medium of claim 9, wherein the reservoir parameters comprise seismic attributes from seismic surveys of a subsurface geological structure.

11. The non-transitory computer-readable storage medium of claim 9, wherein the reservoir parameters comprise rock and mechanical properties from a geological model of a subsurface geological structure.

12. The non-transitory computer-readable storage medium of claim 9, wherein the reservoir parameters comprise a structural model of a subsurface geological structure.

13. The non-transitory computer-readable storage medium of claim 9, wherein the reservoir parameters comprise a paleo-stress regime of a subsurface geological structure.

14. The non-transitory computer-readable storage medium of claim 9, wherein the plurality of parameters comprise a deformation model, a brittleness index, and a stress model.

15. The non-transitory computer-readable storage medium of claim 9, comprising determining a deformation model for use in the geomechanical model.

16. The non-transitory computer-readable storage medium of claim 9, comprising:
identifying a location in the secondary naturally fractured reservoir using the secondary fracture model; and
controlling a drilling operation to drill a well in a subsurface geological structure at the location in the secondary naturally fractured reservoir.

17. A system for developing a developing a naturally fractured reservoir, comprising:
a processor;
a non-transitory computer-readable memory accessible by the processor and having executable code stored thereon, the executable code comprising a set of instructions that causes a processor to perform operations comprising:
obtaining a plurality of reservoir parameters representing a respectively plurality of properties of a primary naturally fractured reservoir;
determining a stacked geological model extending from the primary naturally fractured reservoir to a secondary naturally fractured reservoir;
determining a geomechanical model using the obtained plurality of reservoir parameters and the stacked geological model;
forming a primary natural fracture model by processing the obtained plurality of reservoir parameters and a plurality of petrophysical properties from the geological model to identify the presence and extent of natural fractures at locations in the primary naturally fractured reservoir;
extracting a plurality of parameters from the primary natural fracture model for the primary naturally fractured reservoir; and
constructing a secondary fracture model for the secondary naturally fractured reservoir using the extracted plurality of parameters to identify the presence and extent of natural fractures at locations in the secondary naturally fractured reservoir.

18. The system of claim 17, wherein the reservoir parameters comprise seismic attributes from seismic surveys of a subsurface geological structure.

19. The system of claim 17, wherein the reservoir parameters comprise rock and mechanical properties from a geological model of a subsurface geological structure.

20. The system of claim 17, wherein the reservoir parameters comprise a structural model of a subsurface geological structure.

21. The system of claim 17, wherein the reservoir parameters comprise a paleo-stress regime of a subsurface geological structure.

22. The system of claim 17, wherein the plurality of parameters comprise a deformation model, a brittleness index, and a stress model.

23. The system of claim 17, comprising determining a deformation model for use in the geomechanical model.

24. The system of claim 17, comprising:
identifying a location in the secondary naturally fractured reservoir using the secondary fracture model; and controlling a drilling operation to drill a well in a subsurface geological structure at the location in the secondary naturally fractured reservoir.

* * * * *